(12) United States Patent
Goto et al.

(10) Patent No.: US 12,101,580 B2
(45) Date of Patent: Sep. 24, 2024

(54) DISPLAY CONTROL APPARATUS, DISPLAY CONTROL METHOD, AND PROGRAM

(71) Applicant: JVCKENWOOD Corporation, Yokohama (JP)

(72) Inventors: Masaki Goto, Yokohama (JP); Nobuyuki Matsukawa, Yokohama (JP); Tsuyoshi Watanabe, Yokohama (JP); Masaru Kawasaki, Yokohama (JP); Takeshi Ibaraki, Yokohama (JP); Wataru Katase, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 72 days.

(21) Appl. No.: 17/898,403

(22) Filed: Aug. 29, 2022

(65) Prior Publication Data

US 2022/0408062 A1 Dec. 22, 2022

Related U.S. Application Data

(63) Continuation of application No. PCT/JP2020/037984, filed on Oct. 7, 2020.

(30) Foreign Application Priority Data

Mar. 27, 2020 (JP) .................. 2020-057306
Mar. 27, 2020 (JP) .................. 2020-057308

(51) Int. Cl.
*H04N 5/262* (2006.01)
*B60R 1/22* (2022.01)
(Continued)

(52) U.S. Cl.
CPC .............. *H04N 7/181* (2013.01); *B60R 1/22* (2022.01); *B60R 1/26* (2022.01); *B60R 1/28* (2022.01);
(Continued)

(58) Field of Classification Search
CPC ...... H04N 7/181; H04N 5/2628; H04N 23/60; H04N 23/90; B60R 1/22; B60R 1/26;
(Continued)

(56) References Cited

U.S. PATENT DOCUMENTS

2005/0174429 A1   8/2005   Yanai
2012/0169875 A1   7/2012   Matsukawa et al.
(Continued)

FOREIGN PATENT DOCUMENTS

EP   3028898 A1   6/2016
EP   3361722 A1   8/2018
(Continued)

*Primary Examiner* — Sath V Perungavoor
*Assistant Examiner* — Paramita Ghosh
(74) *Attorney, Agent, or Firm* — PROCOPIO, CORY, HARGREAVES & SAVITCH LLP

(57) ABSTRACT

A display control apparatus includes a captured data acquisition unit, a motion state detection unit, an extracted image data generation unit, a display image data generation unit, and an output unit. The captured data acquisition unit is configured to acquire captured data generated as a result of a camera capturing scenery outside a vehicle. The motion state detection unit is configured to detect a motion state of the vehicle. The extracted image data generation unit is configured to generate an extracted image from the captured data by using an angle of view set in accordance with the motion state. The display image data generation unit is configured to generate display image data related to a display image having a preset image size, from extracted image data. The output unit is configured to output the display image to a display unit having the image size.

10 Claims, 27 Drawing Sheets

(51) Int. Cl.
*B60R 1/26* (2022.01)
*B60R 1/28* (2022.01)
*H04N 7/18* (2006.01)
*H04N 23/90* (2023.01)

(52) U.S. Cl.
CPC ........... *H04N 5/2628* (2013.01); *H04N 23/90* (2023.01); *B60R 2300/306* (2013.01)

(58) Field of Classification Search
CPC ............... B60R 1/28; B60R 2300/306; B60R 2300/307; B60R 2300/70; G09G 5/00; G09G 5/36; G09G 5/391
See application file for complete search history.

(56) References Cited

U.S. PATENT DOCUMENTS

| | | |
|---|---|---|
| 2016/0059781 A1 | 3/2016 | Tatara |
| 2018/0370439 A1* | 12/2018 | Katsuyama ............... B60R 1/12 |
| 2019/0075253 A1 | 3/2019 | Wada et al. |
| 2019/0347490 A1 | 11/2019 | Iida et al. |
| 2021/0099662 A1* | 4/2021 | Arakawa ................... B60R 1/00 |

FOREIGN PATENT DOCUMENTS

| | | | |
|---|---|---|---|
| JP | 2003259356 A | 9/2003 |
| JP | 2005223524 A | 8/2005 |
| JP | 2012140106 A | 7/2012 |
| JP | 2013005032 A | 1/2013 |
| JP | 2016048839 A | 4/2016 |
| JP | 2017073733 A | 4/2017 |
| JP | 2018039394 A | 3/2018 |

* cited by examiner

DISPLAY CONTROL APPARATUS, DISPLAY CONTROL METHOD, AND PROGRAM

CROSS REFERENCE TO RELATED APPLICATION

This application is based upon and claims the benefit of priority from Japanese patent application No. 2020-057306 filed on Mar. 27, 2020 and Japanese Patent Application No. 2020-057308 filed on Mar. 27, 2020, the disclosure of which is incorporated herein in its entirety by reference.

BACKGROUND

The present invention relates to a display control apparatus, a display control method, and a program.

There are widely-used systems in which scenery outside a vehicle is captured by a vehicular camera, so that captured images are displayed on a monitor provided in the vehicle. Further, proposals have been made to utilize images captured by a vehicular camera in assisting driving.

For example, in a system disclosed in Patent Literature 1 (Japanese Unexamined Patent Application Publication No. 2016-048839), images from rear and side regions of a vehicle body are displayed in two parts of a monitor screen while using mutually-different compression rates, and the compression rates are varied in accordance with vehicle information.

SUMMARY

As for the images displayed in the abovementioned system, it is not that the information amount of the images themselves is increased. In relation to this, there is a demand for increasing the information amount of an image related to a desired region in accordance with motion states of a vehicle. However, it is not possible to enlarge display regions.

A display control apparatus according to at least one of the present embodiments includes a captured data acquisition unit, a motion state detection unit, an extracted image data generation unit, a display image data generation unit, and an output unit. The captured data acquisition unit is configured to acquire captured data obtained by a camera capturing scenery outside a vehicle. The motion state detection unit is configured to detect a motion state of the vehicle. The extracted image data generation unit is configured to generate an extracted image from an image related to the captured data by using an angle of view set in accordance with the motion state. The display image data generation unit is configured to generate display image data related to a display image having a preset image size, from extracted image data. The output unit is configured to output the display image data to a display unit having the image size.

A display control method according to at least one of the present embodiments includes a captured data acquisition step, a motion state detection step, an extracted image data generation step, a display image data generation step, and an output step. The captured data acquisition step is configured to acquire captured data obtained by a camera capturing scenery outside a vehicle. The motion state detection step is configured to detect a motion state of the vehicle. The extracted image data generation step is configured to generate an extracted image from an image related to the captured data by using an angle of view set in accordance with the motion state. The display image data generation step is configured to generate display image data related to a display image having a preset image size, from extracted image data. The output step is configured to output the display image data to a display unit having the image size.

A program according to at least one of the present embodiments is for causing a computer to implement a display control method, the display control method including a captured data acquisition step, a motion state detection step, an extracted image data generation step, a display image data generation step, and an output step. The captured data acquisition step is configured to acquire captured data obtained by a camera capturing scenery outside a vehicle. The motion state detection step is configured to detect a motion state of the vehicle. The extracted image data generation step is configured to generate an extracted image from an image related to the captured data by using an angle of view set in accordance with the motion state. The display image data generation step is configured to generate display image data related to a display image having a preset image size, from extracted image data. The output step is configured to output the display image data to a display unit having the image size.

DETAILED DESCRIPTION

Figure 1:
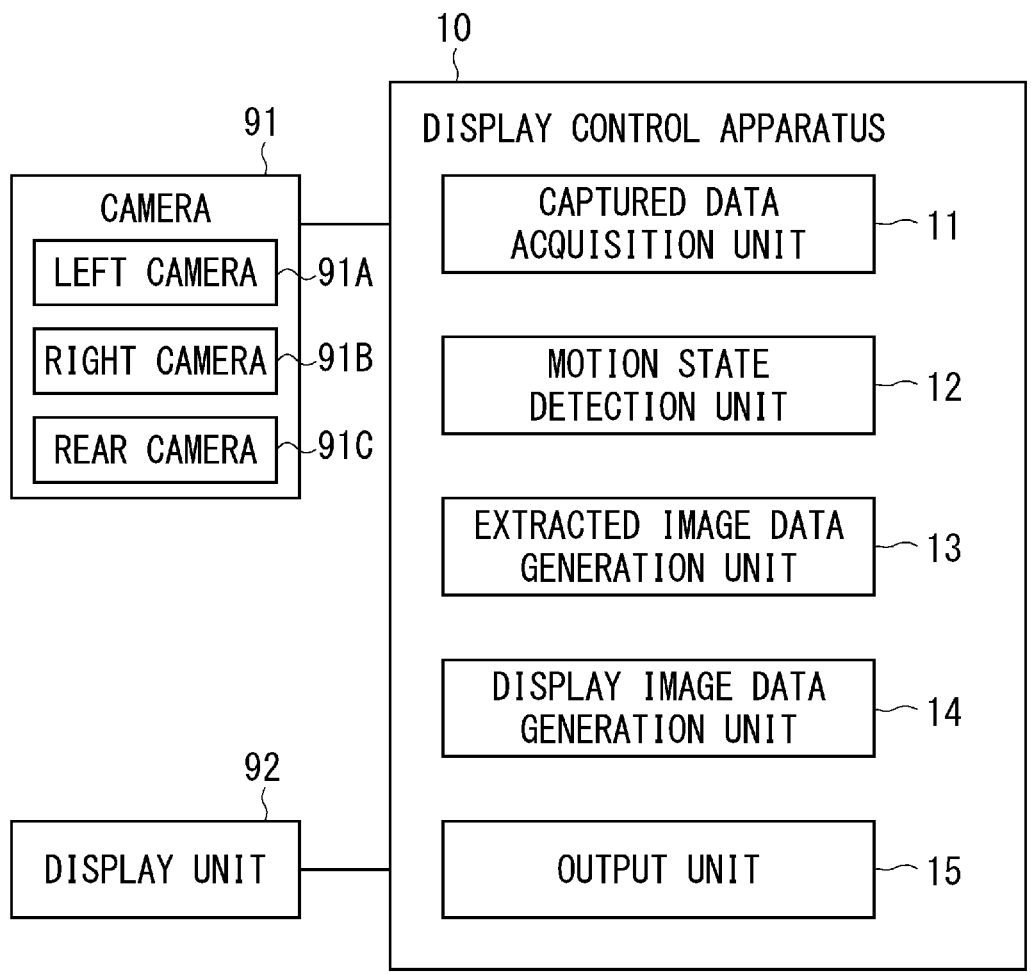
FIG. 1 is a block diagram of a display control apparatus according to a first embodiment.

The following will describe the present invention through embodiments of the invention; however, the invention set forth in the claims is not limited by the embodiments described below. Further, the configurations described in the embodiments are not all necessarily required as means for solving the problem. To make the explanations clear, the description below and the drawings have some omissions or are simplified, as appropriate. In the drawings, some of the elements that are the same as each other are referred to by using mutually the same reference characters, and duplicate explanations are omitted, as necessary.

First Embodiment

A configuration of a display control apparatus according to a first embodiment will be explained, with reference to FIG. 1. FIG. 1 is a block diagram of the display control apparatus according to the first embodiment. A display control apparatus 10 shown in FIG. 1 is connected to a camera 91 and to a display unit 92. The display control apparatus 10, the camera 91, and the display unit 92 are installed in a vehicle.

The camera 91 is installed in an arbitrary position of the vehicle and captures scenery outside the vehicle so as to generate captured data which is data of captured images. The camera 91 generates captured data having 30 frames per second (30 fps), for example, and supplies the generated captured data to the display control apparatus 10 every 1/30 of a second. The captured data may be generated by using a format of H.264 or H.265, for example.

The camera 91 may include a plurality of cameras. The camera 91 in the present embodiment includes a left camera 91A, a right camera 91B, and a rear camera 91C. The left camera 91A, the right camera 91B, and the rear camera 91C are each an imaging apparatus including an objective lens, an image pickup element, an Analog-to-Digital (A-D) conversion element, and the like. The left camera 91A, the right camera 91B, and the rear camera 91C each generate captured data and supply the generated captured data to the display control apparatus 10.

The display unit 92 is a display unit provided so as to be able to present information to a driver and includes a display part such as a liquid crystal panel or an organic electroluminescence (EL) panel, for example. The display unit 92 is installed in such a position (e.g., on a dashboard) that the driver is able to visually recognize the display part. The display unit 92 receives image data from the display control apparatus 10 and displays images related to the received image data on the display part.

The display control apparatus 10 includes a computation apparatus such as a Central Processing Unit (CPU) or a Micro Controller Unit (MCU), for example. Further, in addition to the computation apparatus, the display control apparatus 10 includes, at least, a control board structured with a non-volatile or volatile memory such as a flash memory or a Dynamic Random Access Memory (DRAM) and one or more other electrical circuits. The display control apparatus 10 has a program installed in any of these elements such as the computation apparatus and realizes the functions described below by using a combination of software or hardware.

The display control apparatus 10 processes the image data related to the images captured by the camera 91 and outputs prescribed image data having been processed to the display unit 92. The display control apparatus 10 includes, as primary constituent elements thereof, a captured data acquisition unit 11, a motion state detection unit 12, an extracted image data generation unit 13, a display image data generation unit 14, and an output unit 15. These elements included in the display control apparatus 10 are communicably connected together by a communication bus.

The captured data acquisition unit 11 acquires the captured data generated as a result of the camera 91 capturing the scenery outside the vehicle. The captured data acquisition unit 11 supplies the acquired captured data to the extracted image data generation unit 13 via the communication bus.

The motion state detection unit 12 detects a motion state of the vehicle and generates motion state information corresponding to the motion state. In this situation, the "motion state of the vehicle" denotes a state of motion related to traveling of the vehicle. In other words, in the present embodiment, the motion state of the vehicle may be, for example, a traveling direction of the vehicle or a traveling speed of the vehicle. For example, the motion state detection unit 12 may analyze images related to the captured data acquired by the captured data acquisition unit 11, so as to detect the motion state of the vehicle based on changes in the position of an object included in the analyzed images. The motion state detection unit 12 supplies the motion state information generated in the manner described above, to the extracted image data generation unit 13.

In an example, the motion state detection unit 12 may connect to an acceleration sensor (not shown), for example, so as to detect the motion state of the vehicle based on changes in acceleration obtained from the acceleration sensor. In another example, the motion state detection unit 12 may connect to a positioning information reception unit (not shown) that receives positioning information for positioning the location of the host vehicle from a satellite positioning system such as a Global Navigation Satellite System (GNSS), so as to detect the motion state of the vehicle based on changes in position information obtained from the positioning information reception unit.

The extracted image data generation unit 13 receives the captured data from the captured data acquisition unit 11. Further, the extracted image data generation unit 13 receives the motion state information from the motion state detection unit 12 and determines an angle of view used for generating an extracted image based on the received motion state information. The angle of view shows a range of the captured data to be extracted from the captured data obtained by the camera 91 capturing. More specifically, the extracted image data generation unit 13 according to the present embodiment sets the angle of view corresponding to a traveling speed of the vehicle. For example, the extracted image data generation unit 13 sets a first angle of view corresponding to the traveling speed at a first speed so as to be narrower than a second angle of view corresponding to a second speed lower than the first speed.

The extracted image data generation unit 13 extracts, from the captured data, an image having the angle of view determined as described above and generates extracted image data related to an image of an extracted region (an extracted image). In this manner, the extracted image data generation unit 13 has generated the extracted image from the captured data by using the angle of view set in accordance with the motion state of the vehicle. The extracted image data generation unit 13 supplies the generated extracted image data to the display image data generation unit 14.

The display image data generation unit 14 receives the extracted image data from the extracted image data generation unit 13 and generates display image data by using the received extracted image data. The display image data is image data to be output to the display unit 92 and corresponds to an image size of the display part included in the display unit 92. In the present example, when the display image is to be displayed, not in the entire display part but in a determined region within the display part, the "image size of the display part" denotes the image size of the region. In other words, the display image data generation unit 14 generates the display image data obtained by converting the extracted image so as to have the preset image size. Examples of processes that can be performed by the display image data generation unit 14 on the extracted image include enlarging, reducing, expanding, compressing, noise removal, and tone correction. The display image data generation unit 14 supplies the generated display image to the output unit 15.

Further, specific methods of those processes performed by the display image data generation unit 14 are already known to persons skilled in the art. Accordingly, detailed explanations thereof will be omitted. For example, a specific aspect of the method for enlarging or reducing the image may be expanding or compressing the image. To enlarge or reduce the image, the intervals between a prescribed pixel and the surrounding pixels thereof are changed, and pixels therebetween are interpolated. Further, expanding the image denotes stretching the image along one prescribed direction. In that situation, for the pixels in the stretching direction, the intervals between the pixels are widened, and the pixels therebetween are interpolated. Further, compressing the image denotes shrinking the image along one prescribed direction. In that situation, for the pixels in the shrinking direction, the intervals between the pixels are shortened, and pixels are interpolated as appropriate.

The output unit 15 is an interface for communicably connecting the display control apparatus 10 and the display unit 92 to each other. The output unit 15 outputs the display image to the display unit 92 having the preset image size.

Figure 2:
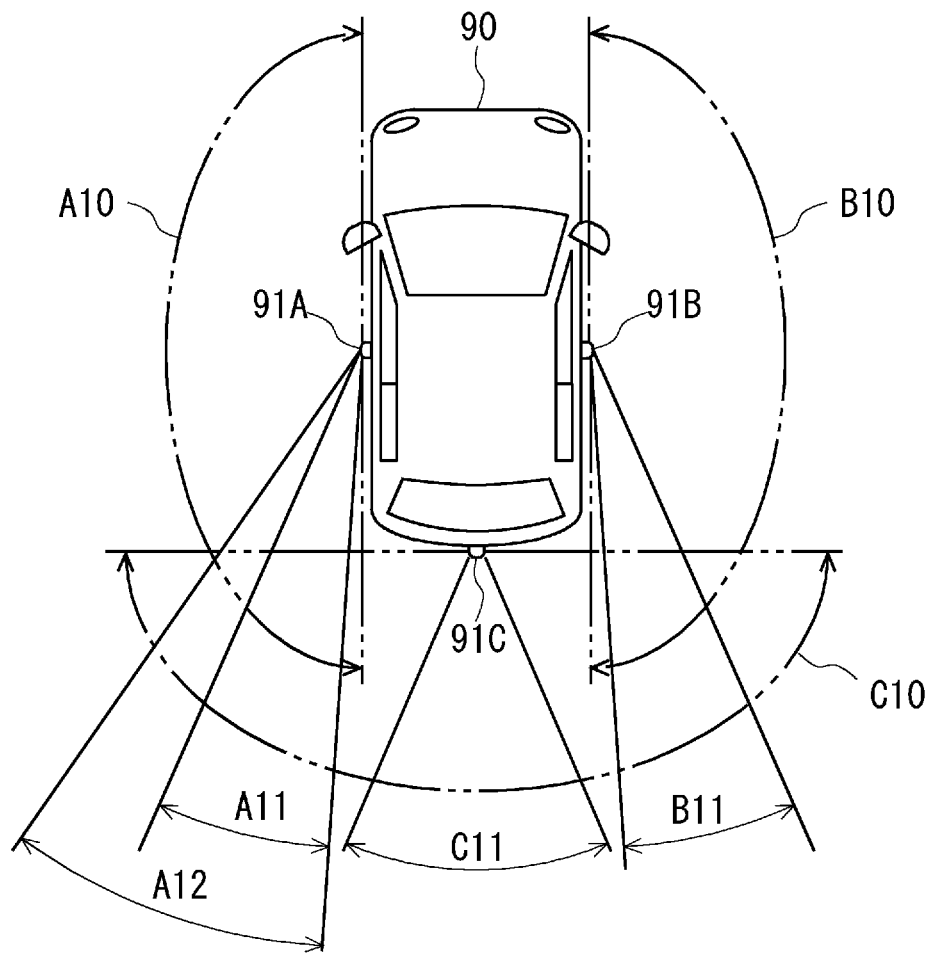
FIG. 2 is a top view showing captured ranges of cameras on a vehicle having the display control apparatus according to the first embodiment installed therein.

Next, an example of captured ranges of the cameras on the vehicle will be explained, with reference to FIG. 2. FIG. 2 is a top view showing the captured ranges of the cameras on the vehicle having the display control apparatus according to the first embodiment installed therein. A vehicle 90 in FIG. 2 is an automobile and serves as an embodiment of a mobile body.

The vehicle 90 has the three cameras explained with reference to FIG. 1, namely, the left camera 91A, the right camera 91B, and the rear camera 91C. The left camera 91A is installed on the left face of the vehicle 90 and captures scenery on the left side of the vehicle 90. For the left camera 91A, a capture angle of view A10 in the horizontal direction indicated by the two-dot chain line is 180 degrees. In other words, images captured by the left camera 91A include the scenery at the angle of view of 180 degrees on the left side of the vehicle 90. The right camera 91B is installed on the right face of the vehicle 90 and captures scenery on the right side of the vehicle 90. For the right camera 91B, a capture angle of view B10 in the horizontal direction is 180 degrees. Similarly, the rear camera 91C is installed on the rear face of the vehicle 90 and captures scenery on the rear side of the vehicle 90. For the rear camera 91C, a capture angle of view C10 in the horizontal direction is 180 degrees. Further, in the following description, an angle of view in the horizontal direction or a horizontal angle of view may simply be referred to as an "angle of view".

The solid lines extending radially from the left camera 91A toward the left rear of the vehicle 90 indicate an angle of view A11 and an angle of view A12 wider than the angle of view A11 of an extracted image extracted from the captured images of the left camera 91A. For example, the extracted image data generation unit 13 sets the first angle of view corresponding to the traveling speed at the first speed to the angle of view A11 and sets the second angle of view corresponding to the second speed lower than the first speed to the angle of view A12.

Further, the solid line extending radially from the right camera 91B toward the right rear of the vehicle 90 indicates an angle of view B11 of an extracted image extracted from the captured images of the right camera 91B. The solid line extending radially from the rear camera 91C toward the rear of the vehicle 90 indicates an angle of view C11 of an extracted image extracted from the captured images of the rear camera 91C.

Figure 3:
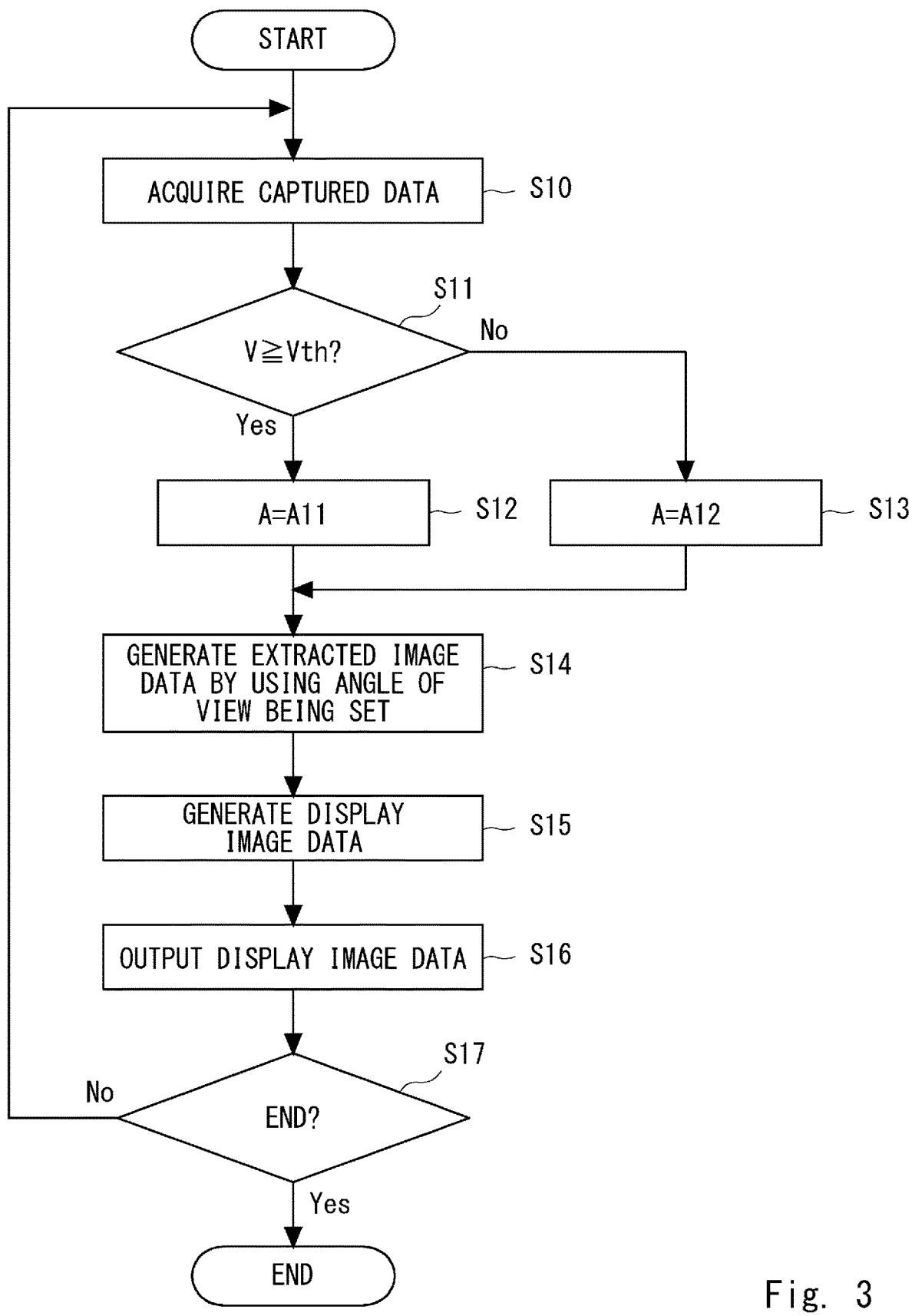
FIG. 3 is a flowchart of the display control apparatus according to the first embodiment.

Next, processes performed by the display control apparatus 10 will be explained, with reference to FIG. 3. FIG. 3 is a flowchart of the display control apparatus 10 according to the first embodiment. The flowchart shown in FIG. 3 indicates processes performed on the left camera 91A by the display control apparatus 10 installed in the vehicle 90 shown in FIG. 2. The flowchart in FIG. 3 is started, for example, when a primary system of the vehicle 90 starts up.

At first, the captured data acquisition unit 11 of the display control apparatus 10 acquires the captured data from the left camera 91A (step S10). After that, as a motion state of the vehicle 90, the motion state detection unit 12 of the display control apparatus 10 determines whether or not a traveling speed V of the vehicle 90 is equal to or higher than a threshold value Vth (step S11). When it is determined that the traveling speed V of the vehicle 90 is equal to or higher than the threshold value Vth (step S11: Yes), the display control apparatus 10 proceeds to step S12. On the contrary, when it is not determined that the traveling speed V of the vehicle 90 is equal to or higher than the threshold value Vth (step S11: No), the display control apparatus 10 proceeds to step S13.

In step S12, the extracted image data generation unit 13 of the display control apparatus 10 sets an angle of view A of the extracted image to the angle of view A11 (step S12). After that, the display control apparatus 10 proceeds to step S14.

In step S13, the extracted image data generation unit 13 of the display control apparatus 10 sets the angle of view A of the extracted image to the angle of view A12 (step S13). After that, the display control apparatus 10 proceeds to step S14.

In other words, the threshold value Vth serves as a condition used by the extracted image data generation unit 13 for setting the angle of view. Further, depending on weather statuses, the threshold value Vth may arbitrarily be changed through a terminal apparatus (not shown) connected to the display control apparatus 10.

In step S14, the extracted image data generation unit 13 of the display control apparatus 10 generates extracted image data by using the set angle of view (step S14). In other words, when the traveling speed V of the vehicle is equal to or higher than the threshold value Vth, the extracted image data generation unit 13 generates the extracted image data related to the extracted image having the angle of view A11. In contrast, when the traveling speed V of the vehicle is not equal to or higher than the threshold value Vth, the extracted image data generation unit 13 generates the extracted image data related to the extracted image having the angle of view A12 that is wider than the angle of view A11. When having generated the extracted image data, the extracted image data generation unit 13 supplies the generated extracted image data to the display image data generation unit 14.

Subsequently, the display image data generation unit 14 of the display control apparatus 10 generates display image data from the extracted image data received from the extracted image data generation unit 13 (step S15) and supplies the generated display image data to the output unit 15. More specifically, when the traveling speed is equal to or higher than the threshold value Vth, the display image data is generated while keeping the image size thereof. On the contrary, when the traveling speed is not equal to or higher than the threshold value Vth, the display image data is generated by shrinking the image thereof along a prescribed direction.

Subsequently, the output unit 15 of the display control apparatus 10 outputs the display image data received from the display image data generation unit 14 to the display unit 92 (step S16).

After that, the display control apparatus 10 determines whether or not the series of processes is to be ended (step S17). Examples of situations where the series of processes is ended include when the system is stopped and when the processes are ended according to an operation performed by the driver. When it is not determined that the series of processes is to be ended (step S17: No), the display control apparatus 10 returns to step S10 and continues the processes. When it is determined that the series of processes is to be ended (step S17: Yes), the display control apparatus 10 ends the processes.

By performing the processes described above, the display control apparatus 10 sets the angle of view of the extracted image in accordance with the traveling speed of the vehicle 90. In the above description, the processes for the left camera 91A were used as an example. However, needless to say, the processes described above are applicable to processes of the right camera 91B or the rear camera 91C.

Figure 4:
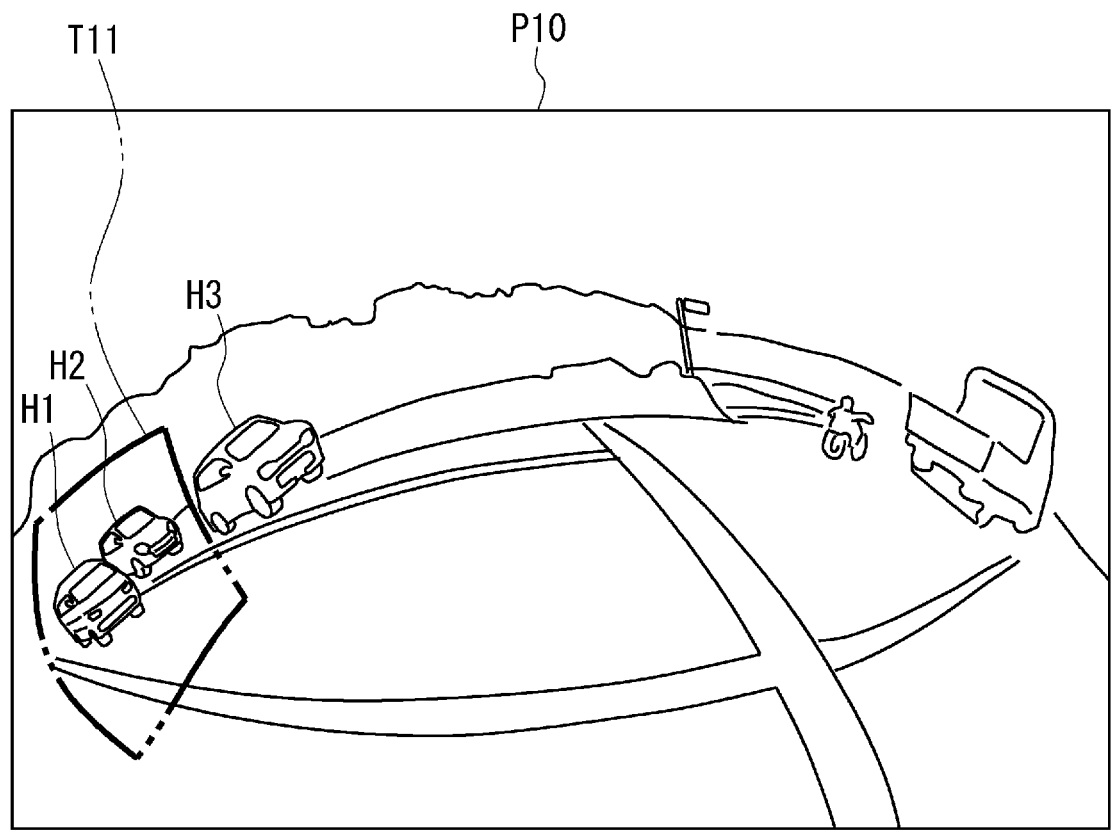
FIG. 4 is a drawing showing a first example of images captured by a left camera.

Next, an example of the images captured by the left camera 91A will be explained, with reference to FIG. 4. FIG. 4 is a drawing showing a first example of the images captured by the left camera 91A. An image P10 shown in FIG. 4 is obtained as a result of the left camera 91A capturing scenery on the left side of the vehicle 90. The right side of the image P10 shows scenery on the left front of the vehicle 90, whereas the left side of the image P10 shows scenery on the left rear of the vehicle 90. On the right side of the image P10, a truck and a motorcycle are captured. In other words, on the left front of the vehicle 90, the truck and the motorcycle are present. Further, on the left side of the image P10, another vehicle H1, yet another vehicle H2, and yet another vehicle H3 are captured. In other words, on the left rear of the vehicle 90, the other vehicles H1 to H3 are present. In this situation, because the image P10 is an image captured with a wide angle by using the angle of view of 180 degrees, the image has prescribed lens distortion. Accordingly, images included in the image P10 are displayed in a distorted state.

On the left side of the image P10 shown in FIG. 4, a border T11 of the extracted image is indicated by a bold two-dot chain line. In other words, the extracted image corresponds to the region enclosed by the border T11. In this situation, the border T11 represents the extracted image related to the angle of view A11 described above. When generating extracted image data from the captured data shown in FIG. 4, the extracted image data generation unit 13 sets the angle of view A11 because the traveling speed V of the vehicle 90 is equal to or higher than Vth and further extracts the region indicated by the border T11. The region enclosed by the border T11 contains the other vehicles H1 and H2. Accordingly, the extracted image contains the other vehicles H1 and H2.

In this situation, the border T11 shown in FIG. 4 is distorted so as to correspond to the lens distortion which the image P10 has. The display image data generation unit 14 processes the extracted image so that the border T11 becomes rectangular, while the image size becomes equal to an image size of a display image (explained later).

Figure 5:
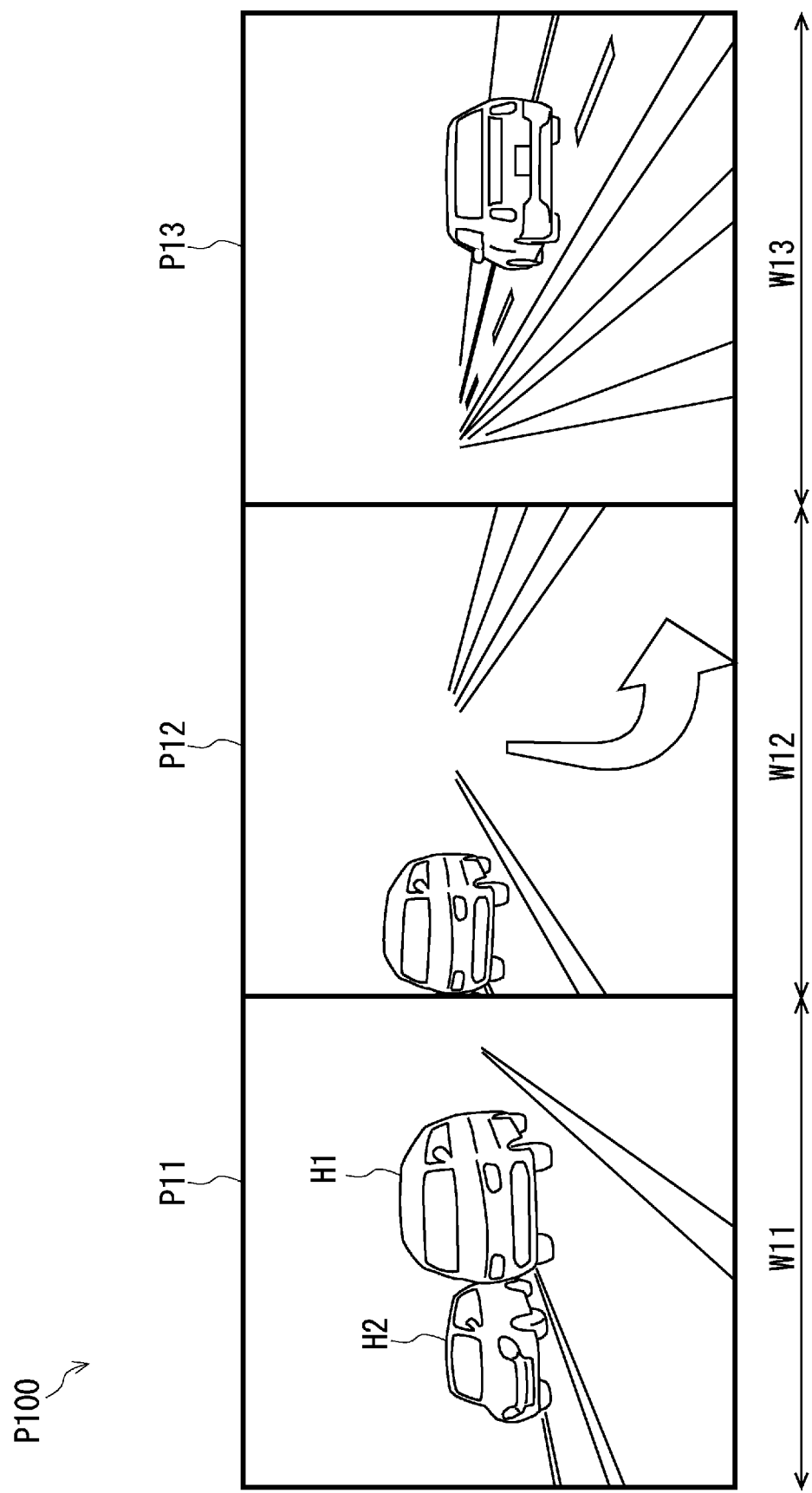
FIG. 5 is a drawing showing a first example of a display image displayed on a display unit according to the first embodiment.

Next, an example of the display image displayed on the display unit 92 will be explained, with reference to FIG. 5. FIG. 5 is a drawing showing a first example of the display image displayed on the display unit according to the first embodiment. FIG. 5 shows a display image P100. The display image P100 includes a left display image P11, a rear display image P12, and a right display image P13.

The left display image P11 is an image generated from the captured data of the left camera 91A. The rear display image P12 is an image generated from the captured data of the rear camera 91C. The right display image P13 is an image generated from the captured data of the right camera 91B. In other words, the display image P100 displays the images arranged side by side resulting from the extracted image data generation unit 13 extracting data, as appropriate, from the pieces of captured data respectively generated by the left camera 91A, the right camera 91B, and the rear camera 91C and further the display image data generation unit 14 processing the data as the display images. In the display image P100, the left display image P11 is displayed in a region having a width W11. In the display image P100, the rear display image P12 is displayed in another region having a width W12. Further, in the display image P100, the right display image P13 is displayed in yet another region having a width W13.

The left display image P11 shown in FIG. 5 was generated from the extracted image data extracted by the border T11 shown in FIG. 4. Accordingly, the left display image P11 contains the other vehicles H1 and H2. As shown in the drawing, from the extracted image data having the lens distortion, the display image data generation unit 14 has generated the left display image P11 as an image having substantially no distortion. As described herein, the display image data generation unit 14 generates and displays the left display image P11, the rear display image P12, and the right display image P13 included in the display image P100, as the images in the state of having substantially no distortion, from the respective pieces of captured data.

Figure 6:
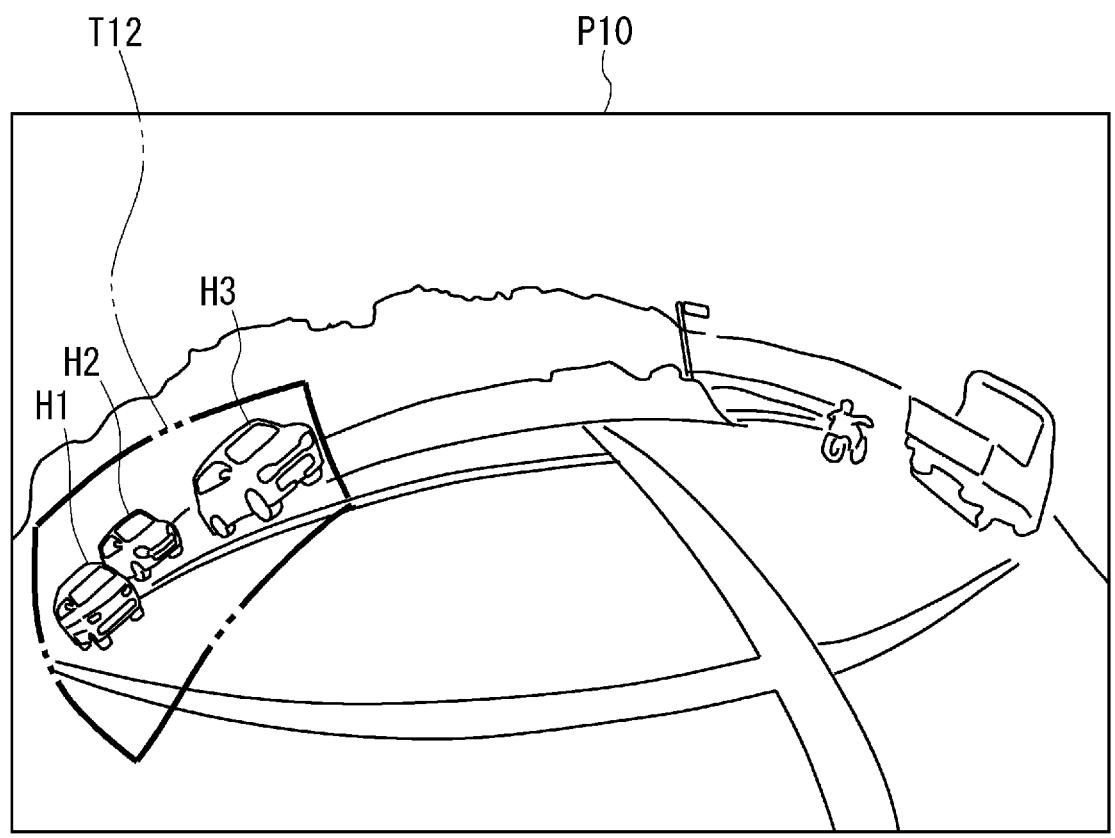
FIG. 6 is a drawing showing a second example of the images captured by the left camera.

Next, another example of the images captured by the left camera 91A will be explained, with reference to FIG. 6. FIG. 6 is a drawing showing a second example of the images captured by the left camera. Similarly to the image shown in FIG. 4, the image P10 shown in FIG. 6 is obtained as a result of the left camera 91A capturing scenery on the left side of the vehicle 90. In the image P10 shown in FIG. 6, a border T12 related to an extracted image is different from the border T11 shown in FIG. 4.

On the left side of the image P10 shown in FIG. 6, the border T12 is indicated by a bold two-dot chain line. The border T12 represents the extracted image related to the angle of view A12 described above. When generating extracted image data from the captured data shown in FIG. 6, the extracted image data generation unit 13 sets the angle of view A12 because the traveling speed V of the vehicle 90 is lower than Vth and further extracts the region indicated by the border T12. The angle of view A12 is wider than the angle of view A11. Accordingly, the region enclosed by the border T12 contains the other vehicle H3, in addition to the other vehicles H1 and H2. As a result, the extracted image contains the other vehicles H1 to H3. The display image data generation unit 14 processes the extracted image so that the border T12 becomes rectangular, while the image size becomes equal to an image size of a display image (explained later).

Figure 7:
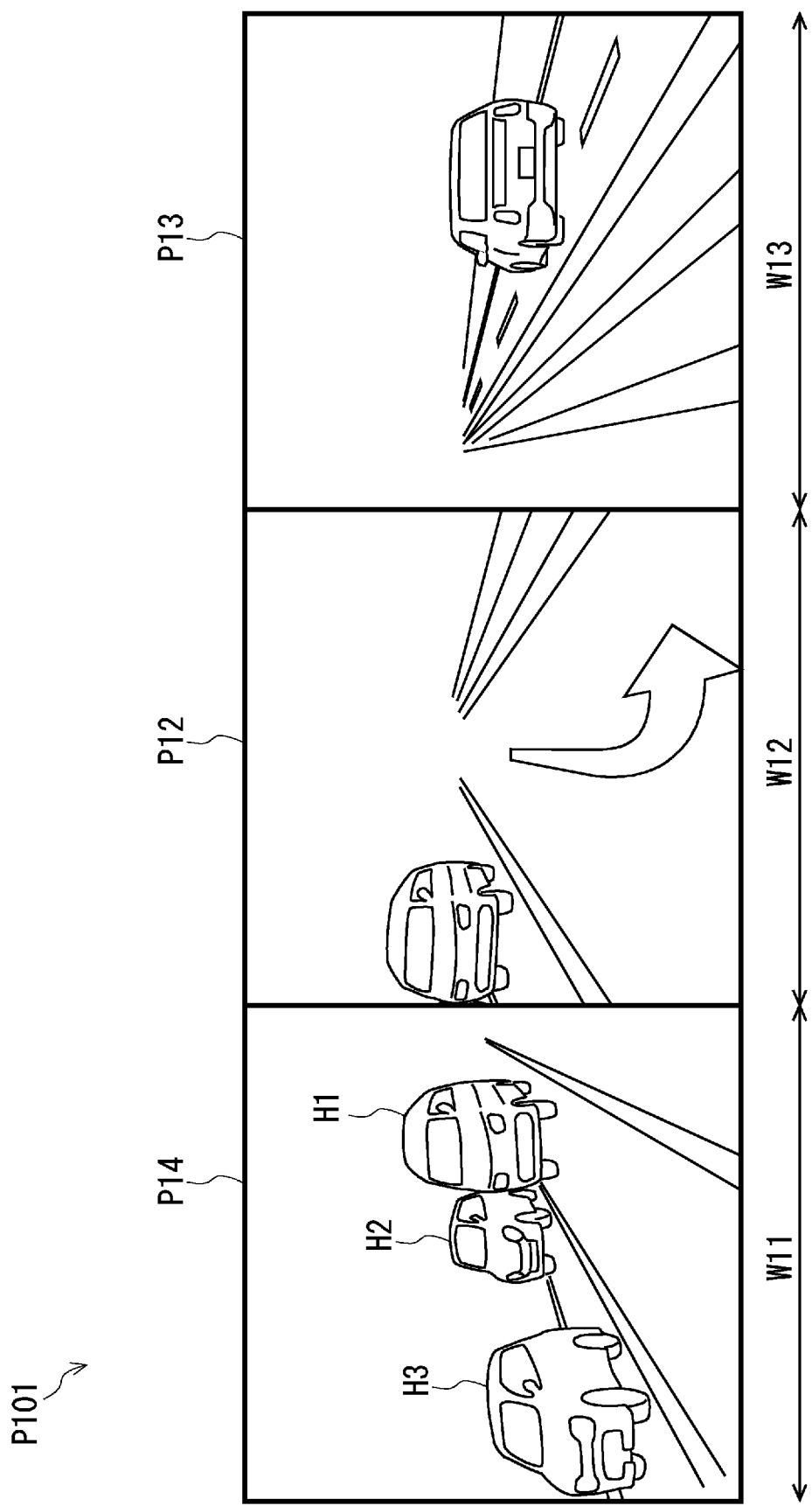
FIG. 7 is a drawing showing a second example of the display image displayed on the display unit according to the first embodiment.

Next, another example of the display image displayed on the display unit 92 will be explained, with reference to FIG. 7. FIG. 7 is a drawing showing a second example of the display image displayed on the display unit according to the first embodiment. FIG. 7 shows a display image P101. The display image P101 is different from the image P100 shown in FIG. 5 for including a left display image P14 in place of the left display image P11. In the following sections, differences from the image P100 will primarily be explained.

The left display image P14 shown in FIG. 7 was generated from the extracted image data extracted by the border T12 shown in FIG. 6. Accordingly, the left display image P14 contains the other vehicle H3 in addition to the other vehicles H1 and H2. Further, the width W11 with which the left display image P14 is displayed is the same as the width W11 of the left display image P11 shown in FIG. 5. In other words, the left display image P14 displays the image related to the angle of view A12 wider than the angle of view A11, while using the same width as the image related to the angle of view A11. Accordingly, when the left display image P11 is compared with the left display image P14, the width of the left display image P14 is relatively shrunk along the left-and-right direction. In other words, the angle of view of the image displayed as the left display image P11 when the traveling speed V is lower than Vth is wider than the angle of view in the situation where the traveling speed V is equal to or higher than Vth. As described herein, the display control apparatus 10 is capable of displaying the image of the wider range, without the need to enlarge the area of the display part. Consequently, the display control apparatus 10 is able to suitably assist driving of the user.

In the above description, the captured data of the left camera 91A was used as an example. However, the configuration described above is also applicable to the right camera 91B and the rear camera 91C. Further, although the display control apparatus 10 according to the present embodiment includes the abovementioned three types of cameras as the camera 91, the number of cameras may be one or more. Further, because the camera 91 in the above example includes a fisheye lens, the image related to the captured data has the lens distortion. However, possible examples of the images captured by the camera 91 are not limited to those described above, and the images do not necessarily have to have distortion. Further, the abovementioned relationship between the traveling speed V of the vehicle and the angle of view A is merely an example. As long as the angle of view related to the extracted image data is set in accordance with the motion state of the vehicle, possible relationships between the traveling speed V and the angle of view A are not limited to the relationship described above.

Further, the display image data generation unit 14 may display the extracted image related to the extracted image data after rotating the image by 90 degrees with respect to the display part. For example, converting the extracted image into a display image as the left display image P14 without rotation will be referred to as a first conversion. In contrast, converting the extracted image into a display image as the left display image P14 with the rotation of 90 degrees will be referred to as a second conversion. In that situation, when the distortion of the image related to the first conversion is larger than the distortion of the image related to the second conversion, the display image data generation unit 14 may generate the display image by converting the extracted image with the second conversion. With this configuration, the display control apparatus 10 is able to display the image that is less distorted and has a suitable angle of view.

The first embodiment has thus been explained. By displaying the image shrunk along the left-and-right direction, the display control apparatus 10 according to the first embodiment is configured to display the image having a wider angle of view than in the situations without the shrinkage. Consequently, according to the first embodiment, it is possible to provide the display control apparatus and the like capable of suitably displaying the images captured by the cameras.

Second Embodiment

Figure 8:
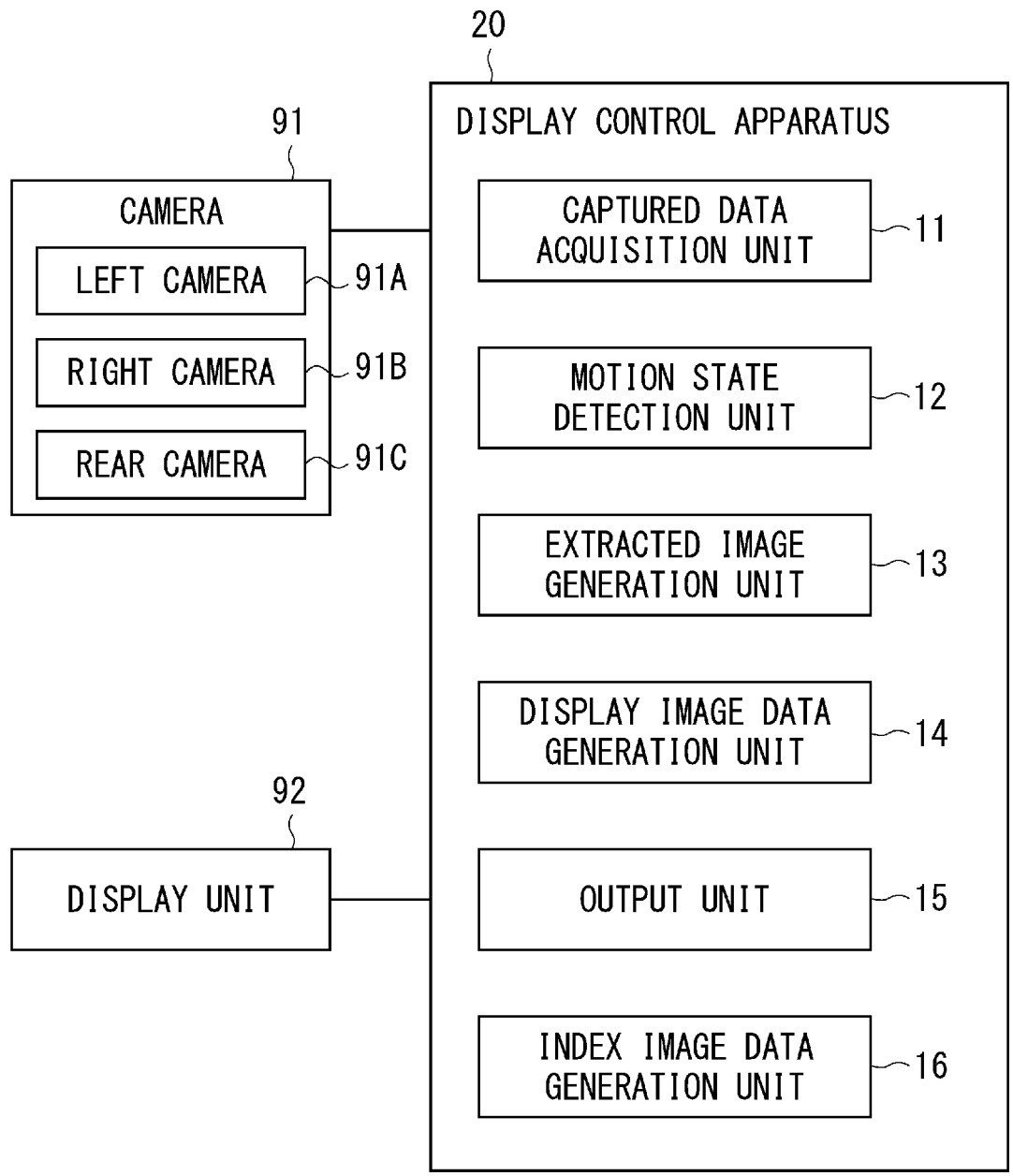
FIG. 8 is a block diagram of a display control apparatus according to a second embodiment.

Next, a second embodiment will be explained. A display control apparatus according to the second embodiment is different from the apparatus according to the first embodiment for including an index image data generation unit. FIG. 8 is a block diagram of the display control apparatus according to the second embodiment. A display control apparatus 20 shown in FIG. 8 includes an index image data generation unit 16.

The index image data generation unit 16 acquires a distortion state of a display image generated by the display image data generation unit 14 and further generates an index image corresponding to the acquired distortion state. The "index image data" denotes data of the "index image" indicating a distorted state of the display image included in the display image data. For example, the index image is configured so as to be able to be compared with an image in the situation where the display image data generation unit 14 has generated the image without any distortion.

The index image data generation unit 16 generates the index image data including the index image for expressing the distortion of the display image. Further, the index image data generation unit 16 supplies the generated index image data to the display image data generation unit 14. Further, the display image data generation unit 14 generates display image data in which the index image data received from the index image data generation unit 16 is superimposed.

Figure 9:
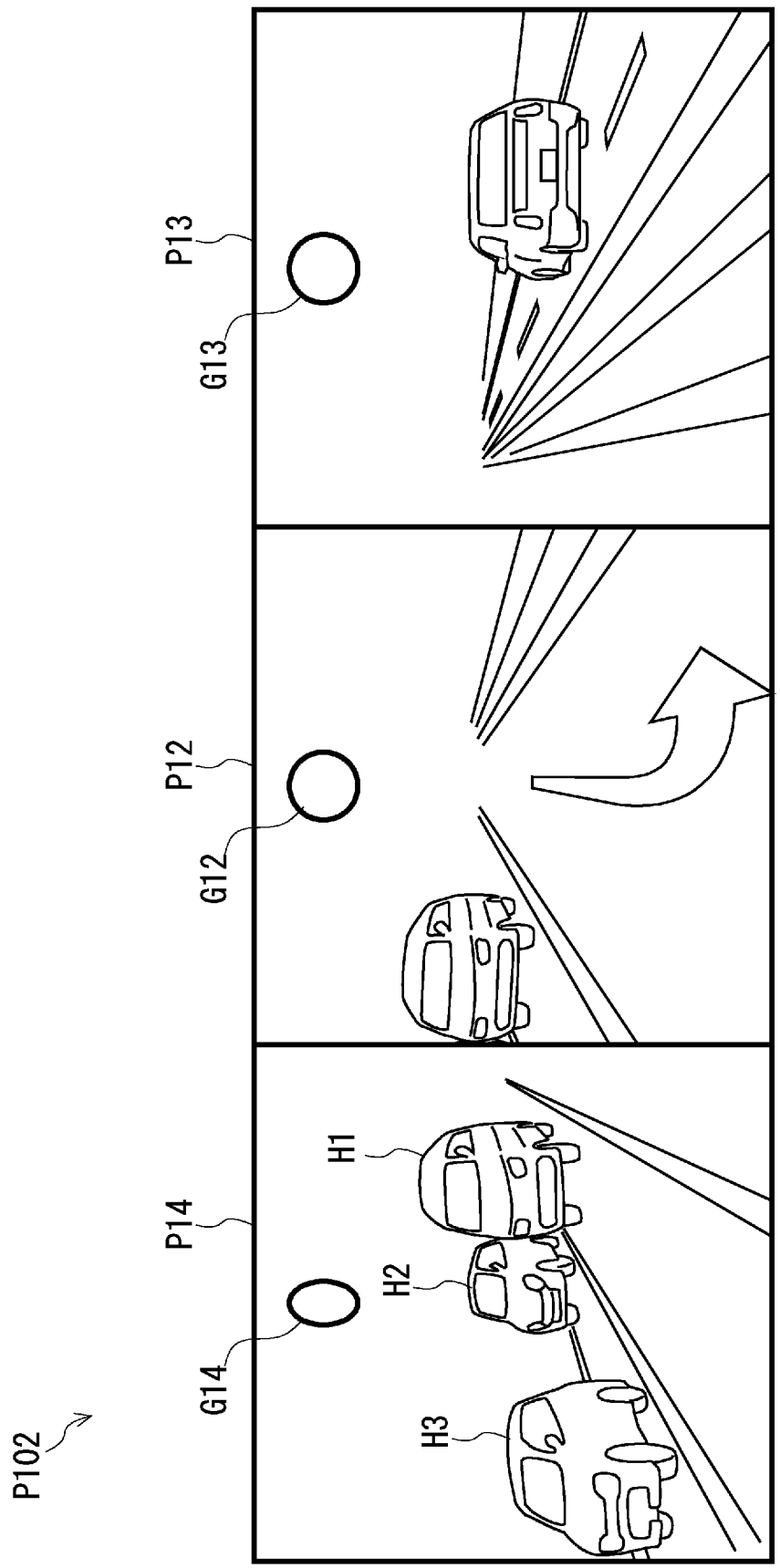
FIG. 9 is a drawing showing an example of a display image according to the second embodiment.

Specific examples of the index image will be explained, with reference to FIG. 9. FIG. 9 is a drawing showing an example of a display image according to the second embodiment. An image P102 shown in FIG. 9 is obtained by superimposing index images onto the image P101 shown in FIG. 7. In an upper part of the left display image P14, an index image G14 is superimposed. In an upper part of the rear display image P12, an index image G12 is superimposed. In an upper part of the right display image P13, an index image G13 is superimposed. By having each of the index images G12 to G14 arranged in the upper part of the corresponding image, the display control apparatus 10 prevents the index images from obstructing the display of the other vehicles and the road.

The index image G12 and the index image G13 each have a circular shape. It means that the rear display image P12 related to the index image G12 is not distorted and that the rear display image P13 related to the index image G13 is not distorted. In contrast, the index image G14 has a vertically elongated oval shape of which the dimension in the up-and-down direction is relatively long, while the dimension in the left-and-right direction is relatively short. Further, the dimension of the oval in the up-and-down direction is equal to that of each of the index images G12 and G13. In other words, the index image G14 has a shape relatively shrunk along the left-and-right direction, as compared to the index image G12 and the index image G13. It is thus indicated that the left display image P14 related to the index image G14 is relatively shrunk along the left-and-right direction. From this display, the user who views the index images is able to intuitively understand how the display image related to the index image is distorted.

The second embodiment has thus been explained. The actual distortion may be multiplied by a preset coefficient that has been set so that the index image has a distortion with the same tendency as that of the distortion of the display image and of a different degree. With this arrangement, the display control apparatus 20 is able to generate the index image data so that the user is able to understand the distortion state more intuitively. Further, although the index image is superimposed on the display image in the above example, the index image does not necessarily have to be superimposed inside the display image. For example, when the display image is smaller than the image size of the display part so that there is another display region, the index image may be displayed in the other display region.

The second embodiment has thus been explained. The display control apparatus 20 according to the second embodiment displays the image shrunk along the left-and-right direction and further displays the index image indicating that the display image is shrunk and is in the distorted state. Consequently, according to the second embodiment, it is possible to provide the display control apparatus and the like capable of suitably displaying the images captured by the cameras.

Third Embodiment

Figure 10:
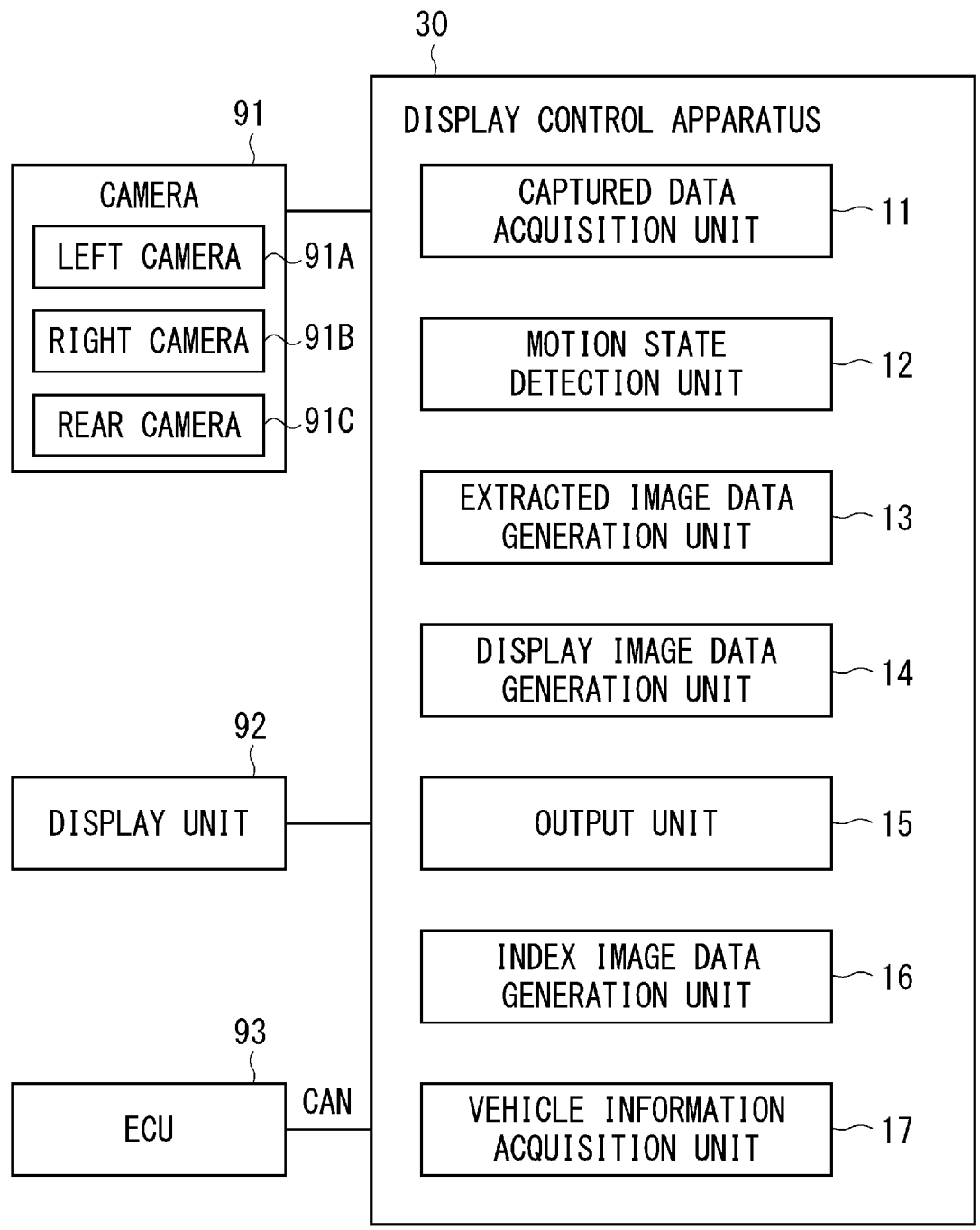
FIG. 10 is a block diagram of a display control apparatus according to a third embodiment.

Next, a third embodiment will be explained. A display control apparatus according to the third embodiment is different from the apparatus according to the second embodiment for further including a vehicle information acquisition unit. FIG. 10 is a block diagram of the display control apparatus according to the third embodiment. A display control apparatus 30 shown in FIG. 10 is different from the apparatuses in the first and the second embodiments for including a vehicle information acquisition unit 17. Further, the display control apparatus 30 is connected to an Electronic Control Unit (ECU) 93 of the vehicle 90 via an in-vehicle communication bus such as a Controller Area Network (CAN).

The vehicle information acquisition unit 17 communicably connects to the ECU 93 included in the vehicle 90 via the CAN serving as the in-vehicle communication bus and acquires vehicle information from the ECU 93. The vehicle information is information related to a driven state of the vehicle and may indicate, for example, an accelerator opening degree, a steering-wheel steer angle, an operation state of a turn signal indicator (hereinafter, "blinker"), a shift lever position, and/or the like. Further, the vehicle information may be a combination of the motion state and a traveling speed of the vehicle 90. The vehicle information acquisition unit 17 supplies the acquired vehicle information to the motion state detection unit 12.

The motion state detection unit 12 receives the vehicle information from the vehicle information acquisition unit 17 and detects a motion state by using the received vehicle information. For example, when it is indicated from the vehicle information acquisition unit 17 that the blinker for the left (hereinafter, "left blinker") is on, the motion state detection unit 12 detects that the vehicle 90 is to move to the left. Further, for example, when the left blinker is on while the traveling speed of the vehicle is a cruising speed such as 50 kilometers per hour, the motion state detection unit 12 detects that the vehicle 90 is to change lanes to the left. In yet another example, when the left blinker is on while the traveling speed of the vehicle is approximately 10 kilometers per hour, the motion state detection unit 12 detects that the vehicle 90 has a high possibility of turning left. The motion state detection unit 12 detects the motion state of the vehicle 90 in this manner and further generates motion state information based on the detected motion state. After that, the motion state detection unit 12 supplies the generated motion state information to the extracted image data generation unit 13.

Figure 11:
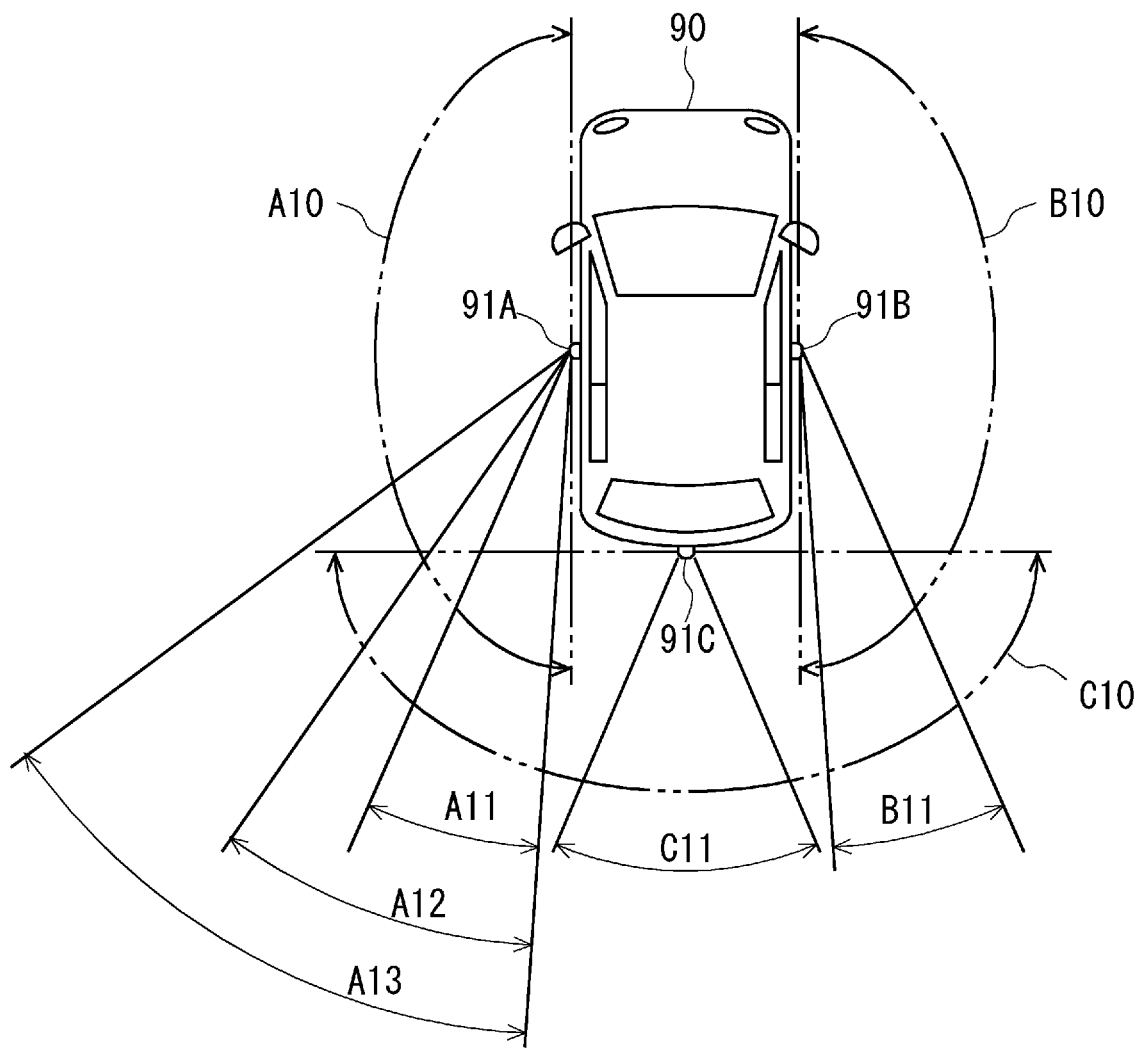
FIG. 11 is a top view showing captured ranges of cameras on a vehicle having the display control apparatus according to the third embodiment installed therein.

Next, an example of captured ranges of the cameras on the vehicle will be explained, with reference to FIG. 11. FIG. 11 is a top view showing the captured ranges of the cameras on the vehicle having the display control apparatus according to the third embodiment installed therein. The top view of the vehicle 90 shown in FIG. 11 is different from that in FIG. 2 for further having an angle of view A13 of the left camera 91A.

In FIG. 11, the solid lines extending radially from the left camera 91A toward the left rear of the vehicle 90 indicate the angle of view A11, the angle of view A12 wider than the angle of view A11, and the angle of view A13 wider than the angle of view A12 of an extracted image extracted from the captured images of the left camera 91A.

For example, while the vehicle 90 is traveling straight and when the traveling speed is the first speed, the extracted image data generation unit 13 sets the angle of view related to the extracted image to the angle of view A11. In another example, when the left blinker of the vehicle 90 is on while the traveling speed is the first speed, the extracted image data generation unit 13 sets the angle of view related to the extracted image to the angle of view A12. When the left blinker of the vehicle 90 is on while the traveling speed is the second speed lower than the first speed, the extracted image data generation unit 13 sets the angle of view related to the extracted image to the angle of view A13.

Figure 12:
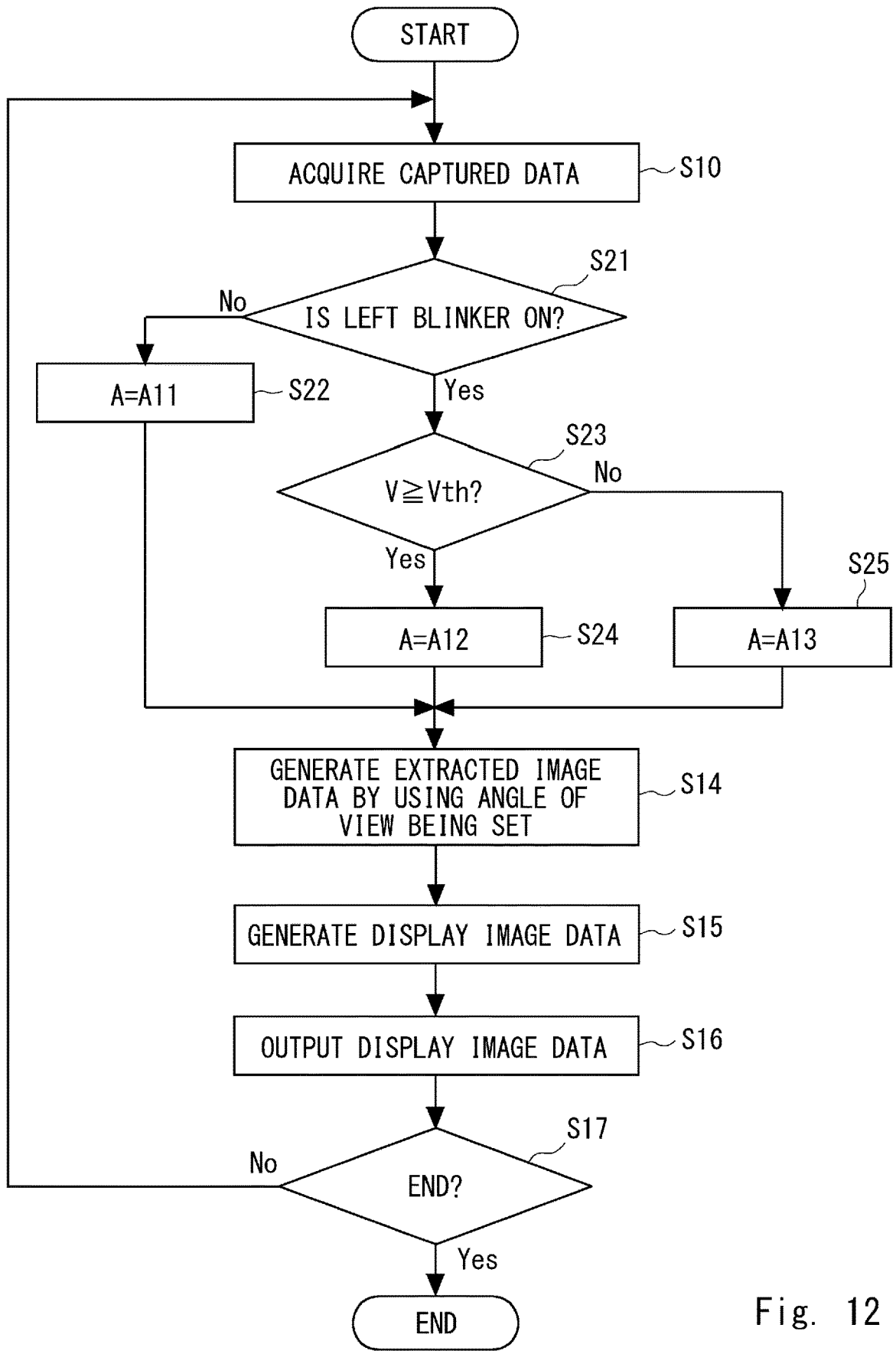
FIG. 12 is a flowchart of the display control apparatus according to the third embodiment.

Next, processes performed by the display control apparatus 30 according to the third embodiment will be explained, with reference to FIG. 12. FIG. 12 is a flowchart of the display control apparatus according to the third embodiment. The flowchart shown in FIG. 12 is different from the flowchart shown in FIG. 3 for the processes performed between step S10 and step S14.

At first, the captured data acquisition unit 11 of the display control apparatus 10 acquires the captured data from the left camera 91A (step S10). Subsequently, as a motion state of the vehicle 90, the motion state detection unit 12 of the display control apparatus 10 determines whether or not the left blinker of the vehicle 90 is on (step S21). When it is not determined that the left blinker of the vehicle 90 is on (step S21: No), the display control apparatus 10 proceeds to step S22. On the contrary, when it is determined that the left blinker of the vehicle 90 is on (step S21: Yes), the display control apparatus 10 proceeds to step S23.

In step S22, the extracted image data generation unit 13 of the display control apparatus 10 sets the angle of view A of the extracted image to the angle of view A11 (step S22). After that, the display control apparatus 10 proceeds to step S14.

In step S23, the motion state detection unit 12 determines whether or not the traveling speed V of the vehicle 90 is equal to or higher than the threshold value Vth (step S23). When it is determined that the traveling speed V of the vehicle 90 is equal to or higher than the threshold value Vth (step S23: Yes), the display control apparatus 10 proceeds to step S24. On the contrary, when it is not determined that the traveling speed V of the vehicle 90 is equal to or higher than the threshold value Vth (step S23: No), the display control apparatus 10 proceeds to step S25.

In step S24, the extracted image data generation unit 13 of the display control apparatus 10 sets the angle of view A of the extracted image to the angle of view A12 (step S24). After that, the display control apparatus 10 proceeds to step S14.

In step S25, the extracted image data generation unit 13 of the display control apparatus 10 sets the angle of view A of the extracted image to the angle of view A13 (step S25). After that, the display control apparatus 10 proceeds to step S14.

Because step S14 and the steps thereafter are the same as those in the flowchart shown in FIG. 3, the explanations thereof will be omitted.

As a result of the processes described above, the display control apparatus 30 has set the angle of view of the extracted image in accordance with the state of the blinker of the vehicle 90 and the traveling speed of the vehicle 90. In the above description, the processes for the left camera 91A were used as an example. However, needless to say, the processes described above are also applicable to processes for the right camera 91B or the rear camera 91C. Further, the relationship between the angle of view set by the extracted image data generation unit 13 and the motion state is merely an example used for explaining the present embodiment. The display control apparatus 30 may perform processes different from those described above.

Further, the display control apparatus 30 according to the third embodiment does not necessarily have to include the index image data generation unit 16, similarly to the first embodiment. In addition to the vehicle information acquired from the ECU 93, the motion state detection unit 12 may utilize changes in acceleration acquired from an acceleration sensor and/or changes in position information of the host vehicle acquired from a satellite positioning system.

The third embodiment has thus been explained. The display control apparatus 30 according to the third embodiment is capable of setting the angle of view of the extracted image in accordance with the driven state of the vehicle 90. Further, the display control apparatus 30 according to the third embodiment displays the image shrunk along the left-and-right direction and displays the index image indicating that the display image is shrunk and is in the distorted state. Consequently, according to the third embodiment, it is possible to provide the display control apparatus and the like capable of suitably displaying the images captured by the cameras.

Fourth Embodiment

Figure 13:
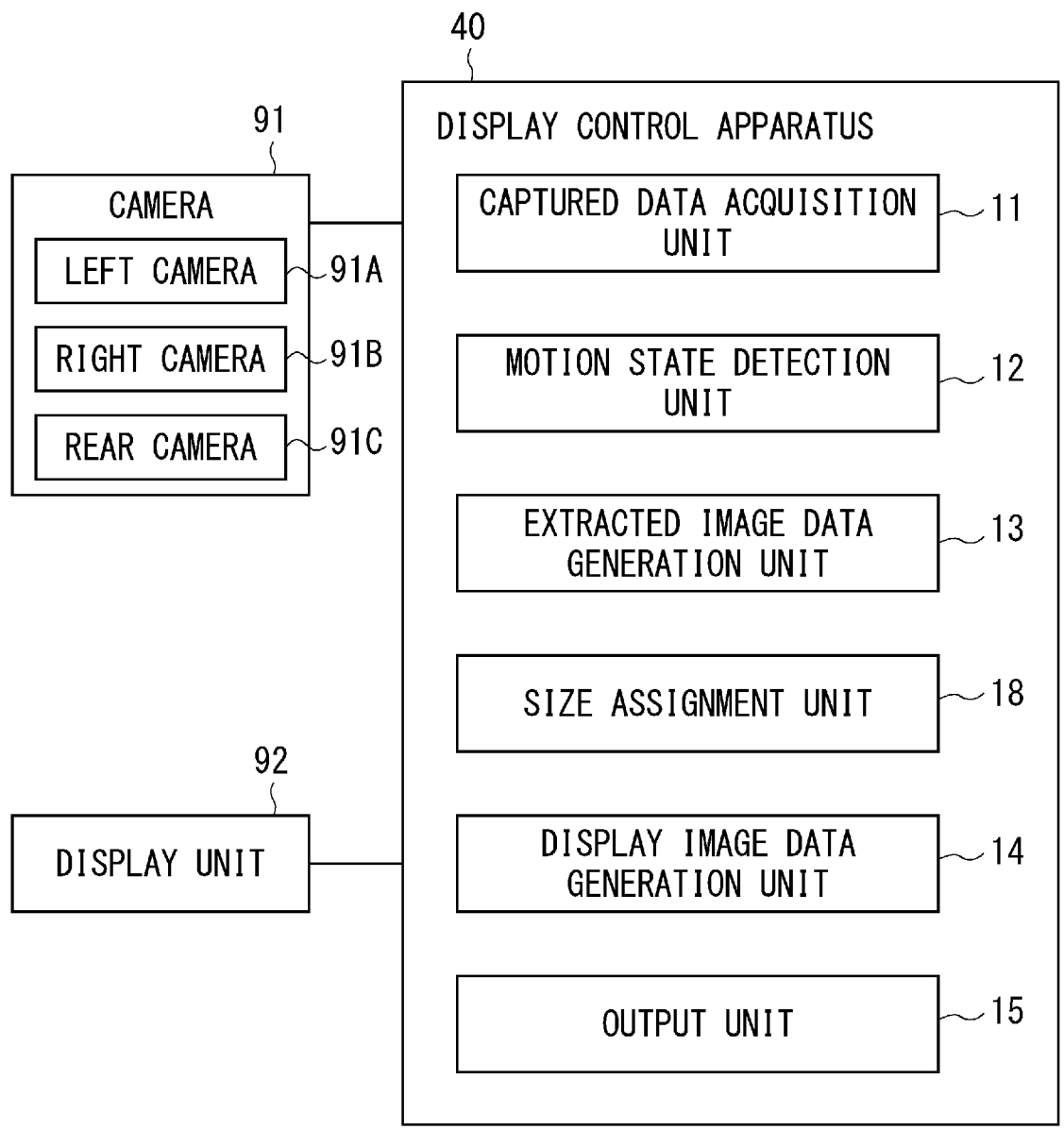
FIG. 13 is a block diagram of a display control apparatus according to a fourth embodiment.

A fourth embodiment will be explained, with reference to FIG. 13. A display control apparatus according to the fourth embodiment is different from the apparatus according to the first embodiment for including a size assignment unit 18. FIG. 13 is a block diagram of a display control apparatus 40 according to the fourth embodiment.

In the fourth embodiment, the motion state of the vehicle includes a change in the traveling direction of the vehicle, whereas the motion state information includes traveling direction change information indicating the change in the traveling direction of the vehicle. The traveling direction change information includes predicted traveling direction information indicating a traveling direction (a predicted traveling direction) into which the vehicle is predicted to make a change. In this situation, the predicted traveling direction may include a traveling direction into which the vehicle 90 is currently making a change. For example, the motion state detection unit 12 may detect a motion state by estimating the predicted traveling direction of the vehicle, based on the position information acquired from the positioning information reception unit and map information. The motion state detection unit 12 according to the fourth embodiment supplies the generated motion state information to the extracted image data generation unit 13 and the size assignment unit 18.

The extracted image data generation unit 13 according to the fourth embodiment sets an angle of view in accordance with the change in the traveling direction of the vehicle. For example, upon detection of the change in the traveling direction of the vehicle, the extracted image data generation unit 13 changes the setting of the angle of view of the image (the extracted image) of a region extracted from the captured data relevant to the predicted traveling direction, from the first angle of view to the second angle of view wider than the first angle of view. In the fourth embodiment, the first angle of view has the magnitude of an initial angle of view set in advance. In this situation, with respect to the angles of view of extracted images extracted from the captured data relevant to the directions different from the predicted traveling direction, the extracted image data generation unit 13 may keep the settings of the angles of view at the first angle of view.

With respect to each of the pieces of captured data, the extracted image data generation unit 13 extracts an image having the set angle of view from the piece of captured data and generates extracted image data related to an extracted image. As described herein, with respect to each of the pieces of captured data, the extracted image data generation unit 13 generates the extracted image data from the image related to the piece of captured data, by using the angle of view that is set in accordance with the motion state. The extracted image data generation unit 13 supplies the generated extracted image data to the display image data generation unit 14.

In response to the motion state having been detected, the size assignment unit 18 assigns the image size of a display image corresponding to each of the plurality of pieces of extracted image data, based on a total image size of the display unit 92. In this situation, the "total image size of the display unit 92" denotes a total of the image sizes of the display images that can be displayed in the display part of the display unit 92. Further, when the display images are to be displayed, not in the entire display part of the display unit 92 but in determined regions within the display part, the "total image size of the display unit 92" denotes a total of the image sizes of such regions. To each of the display images, a corresponding image size shall be assigned. Each of the display images may have a rectangular shape. In that situation, the image size of each of the display images may be expressed as a product of the number of pixels in the width direction corresponding to the dimension in the width direction and the number of pixels in the height direction corresponding to the dimension in the height direction.

The size assignment unit 18 supplies information about the image size of the display image corresponding to each of the plurality of pieces of extracted image data, to the display image data generation unit 14.

The display image data generation unit 14 receives the plurality of pieces of extracted image data from the extracted image data generation unit 13 and receives the information about the image size corresponding to each of the plurality of pieces of extracted image data from the size assignment unit 18. With respect to each of the plurality of pieces of extracted image data, the display image data generation unit 14 generates display image data of a display image having the assigned image size. In other words, the display image data generation unit 14 generates the display image data related to the display image by converting the pixel values of the extracted image so as to have the image size corresponding to the extracted image. The display image data generation unit 14 supplies the generated plurality of pieces of display image data to the output unit 15.

The output unit 15 according to the fourth embodiment outputs the display image data corresponding to each of the plurality of pieces of extracted image data to the display unit 92.

Figure 14:
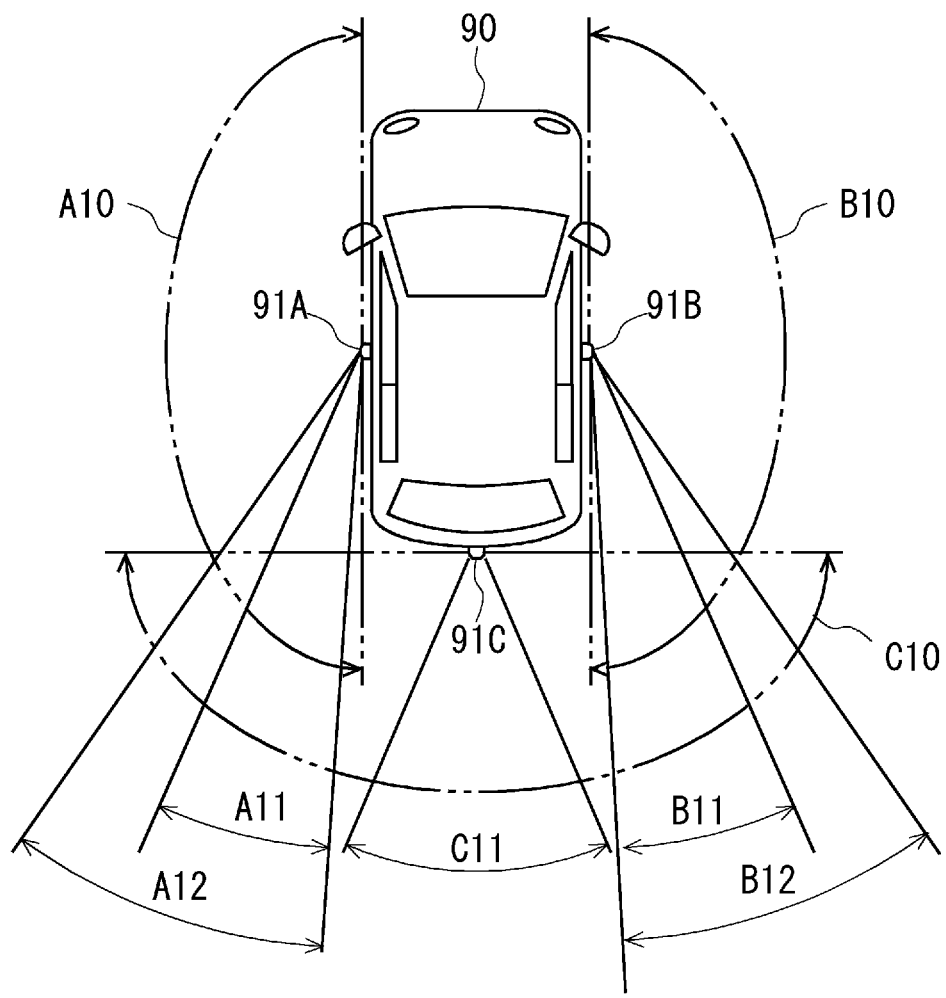
FIG. 14 is a top view showing captured ranges of cameras on a vehicle having the display control apparatus according to the fourth embodiment installed therein.

Next, an example of captured ranges of the cameras on the vehicle will be explained, with reference to FIG. 14. FIG. 14 is a top view showing the captured ranges of the cameras on the vehicle having the display control apparatus according to the fourth embodiment installed therein. The top view of the vehicle 90 shown in FIG. 14 is different from that in FIG. 2 for further having an angle of view B12 of the right camera 91B.

The solid lines extending radially from the right camera 91B toward the right rear of the vehicle 90 indicate the angle of view B11 and the angle of view B12 wider than the angle of view B11 of an extracted image extracted from the captured images of the right camera 91B. The magnitude of the angle of view B11 may be equal to that of the angle of view A11, whereas the magnitude of the angle of view B12 may be equal to that of the angle of view A12. For example, when the vehicle keeps traveling straight in the advancing direction, the extracted image data generation unit 13 sets the angle of view to the angle of view B11 serving as the first angle of view and, upon detection of a change in the traveling direction to the right direction, changes the setting of the angle of view to the angle of view B12 serving as the second angle of view.

In another example, when the vehicle 90 keeps traveling straight in the advancing direction, the extracted image data generation unit 13 sets the angle of view to the angle of view A11 serving as the first angle of view and, upon detection of a change in the traveling direction to the left direction, changes the setting of the angle of view to the angle of view A12 serving as the second angle of view.

Further, from each of the captured images of the scenery on the sides of the mutually-different direction, the extracted image data generation unit 13 generates extracted image data of an extracted image related to the angle of view that has been set. In this situation, the pieces of extracted image data include first extracted image data of an extracted image relevant to the scenery on the side of a first direction (the left in the present example) with respect to the vehicle 90 and second extracted image data of an extracted image relevant to the scenery on the side of a second direction (the right in the present example) with respect to the vehicle 90.

As explained above, upon detection of a change in the traveling direction, the extracted image data generation unit 13 changes the setting of the angle of view of the extracted image relevant to the scenery on the predicted traveling direction side and generates the extracted image data of the extracted image.

Figure 15:
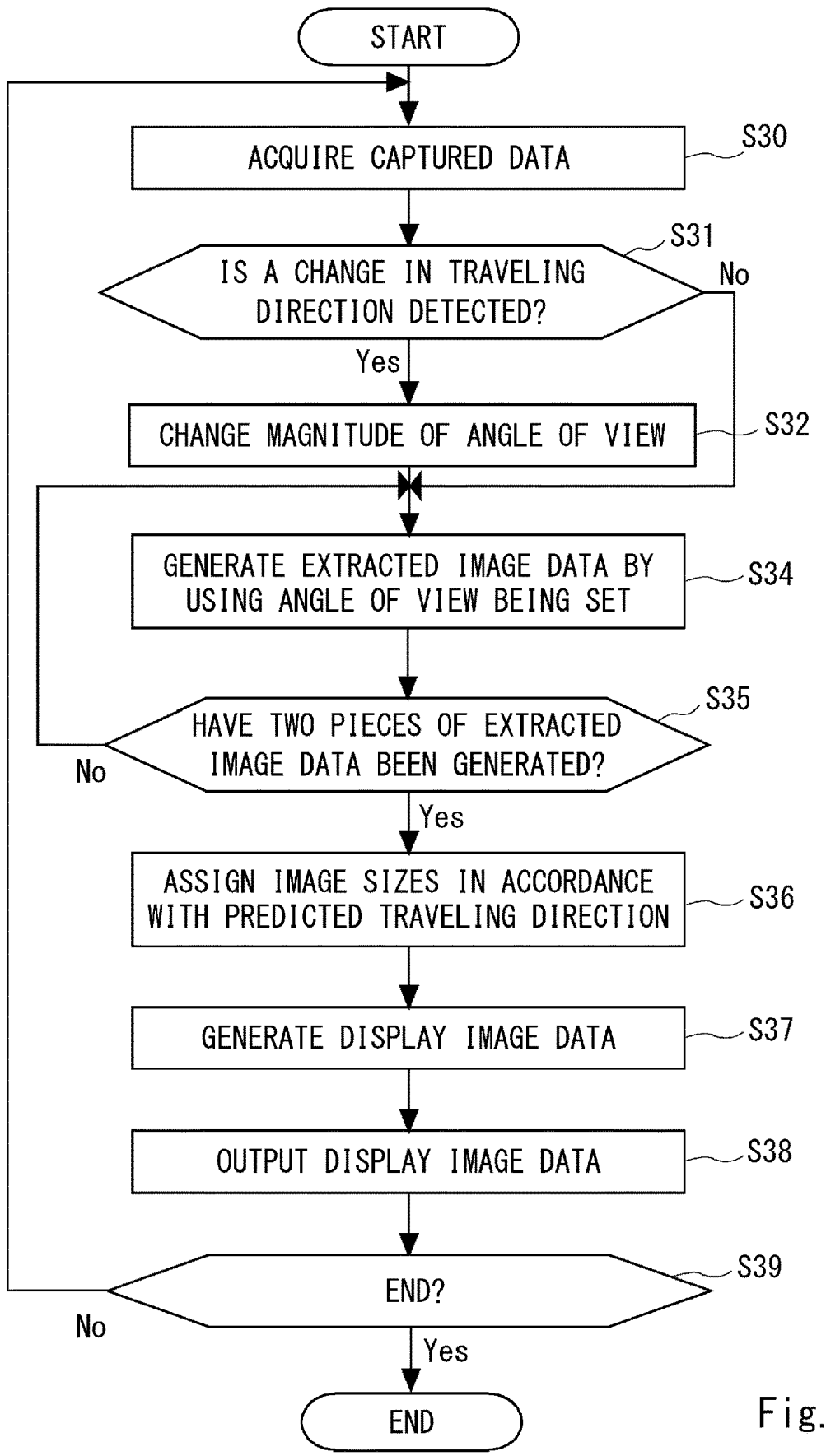
FIG. 15 is a flowchart of the display control apparatus according to the fourth embodiment.

Next, processes performed by the display control apparatus 40 will be explained, with reference to FIG. 15. FIG. 15 is a flowchart of the display control apparatus 40 according to the fourth embodiment. The flowchart shown in FIG. 15 indicates an example of processes performed by the display control apparatus 40 when displaying, on the display unit 92, display images relevant to the scenery on the left side and on the right side of the vehicle 90 shown in FIG. 14 (i.e., an example of a two-screen display). In this situation, it is assumed that the angle of view of both of the extracted images is initially set at the first angle of view.

At first, in step S30, the captured data acquisition unit 11 of the display control apparatus 40 acquires captured data from the left camera 91A and from the right camera 91B. In this situation, the captured data acquired from the left camera 91A is captured data relevant to the scenery on the left side of the vehicle 90, whereas the captured data acquired from the right camera 91B is captured data relevant to the scenery on the right side of the vehicle 90.

Subsequently, in step S31, as a motion state of the vehicle 90, the motion state detection unit 12 of the display control apparatus 40 determines whether or not a change in the traveling direction of the vehicle 90 has been detected. When it is determined that a change in the traveling direction has been detected (step S31: Yes), the motion state detection unit 12 generates traveling direction change information including predicted traveling direction information. After that, the motion state detection unit 12 supplies the traveling direction change information to the extracted image data generation unit 13 and the size assignment unit 18 and advances the process to step S32. On the contrary, when it is not determined that a change in the traveling direction has been detected (step S31: No), the motion state detection unit 12 advances the process to step S34.

In step S32, based on the predicted traveling direction information included in the traveling direction change information, the extracted image data generation unit 13 changes the setting of the angle of view of the extracted image extracted from the captured data relevant to the scenery on the predicted traveling direction side, from the first angle of view to the second angle of view. Further, with respect to the extracted image extracted from the captured data relevant to the direction different from the predicted traveling direction, the extracted image data generation unit 13 keeps the setting of the angle of view at the first angle of view. After that, the extracted image data generation unit 13 advances the process to step S34.

In step S34, by using the angles of view set with the extracted images in correspondence with the types of the captured data, the extracted image data generation unit 13 generates extracted image data from the captured data. In other words, when a change in the traveling direction has been detected, and the predicted traveling direction is the first direction, the extracted image data generation unit 13 generates first extracted image data of an extracted image related to the angle of view A12 that is wider than the angle of view A11, from the captured data from the left camera 91A. Further, in that situation, the extracted image data generation unit 13 generates second extracted image data of an extracted image related to the angle of view B11, from the captured data from the right camera 91B. On the contrary, when a change in the traveling direction has not been detected, and no predicted traveling direction is acquired, the extracted image data generation unit 13 generates first extracted image data of an extracted image related to the angle of view A11, from the captured data from the left camera 91A. Further, in that situation, the extracted image data generation unit 13 generates second extracted image data of an extracted image related to the angle of view B11, from the captured data from the right camera 91B.

In step S35, the extracted image data generation unit 13 determines whether or not all the pieces of extracted image data have been generated. In the fourth embodiment, the extracted image data generation unit 13 determines whether or not two pieces of extracted image data have been generated. When it is determined that all the pieces of extracted image data have been generated (step S35: Yes), the extracted image data generation unit 13 advances the process to step S36. On the contrary, when the determination result is in the negative (step S35: No), the extracted image data generation unit 13 returns the process to step S34. After that, the extracted image data generation unit 13 supplies all the generated pieces of extracted image data to the display image data generation unit 14.

In step S36, with respect to each of the plurality of pieces of extracted image data, the size assignment unit 18 assigns an image size of the display image corresponding to each of the extracted images, in accordance with the predicted traveling direction indicated by the predicted traveling direction information included in the traveling direction change information. In this situation, in response to the predicted traveling direction being the first direction, the size assignment unit 18 assigns the image sizes so that the number of pixels included in the display image corresponding to the first extracted image data is larger than the number of pixels included in the display image corresponding to the second extracted image data. In the fourth embodiment, in response to the predicted traveling direction being the first direction, the size assignment unit 18 assigns the image sizes so that the dimension in a primary direction being the width in the transversal direction of a first display image corresponding to the first extracted image data is larger than the dimension in the primary direction of a second display image corresponding to the second extracted image data. In this situation, the first and the second display images are display images corresponding to the extracted images of the first and the second extracted image data, respectively. Further, the primary direction may be the width direction or the height direction, and is the width direction in the fourth embodiment. Furthermore, in the fourth embodiment, the dimension in the primary direction is the dimension of the width represented by one of the sides in the width direction and corresponds to the number of pixels in the width. The size assignment unit 18 supplies information about the image size of the display image corresponding to each of the plurality of pieces of extracted image data, to the display image data generation unit 14.

Subsequently, in step S37, with respect to each of the plurality of pieces of extracted image data, the display image data generation unit 14 generates display image data of a display image having a corresponding image size.

More specifically, with respect to the extracted image related to the first extracted image data, the display image data generation unit 14 generates first display image data of the first display image without performing a pixel conversion process. In contrast, with respect to the extracted image related to the second extracted image data, the display image data generation unit 14 generates second display image data of the second display image by shrinking the image along a prescribed direction.

After that, the display image data generation unit 14 supplies the generated plurality of pieces of display image data to the output unit 15.

After that, in step S38, the output unit 15 of the display control apparatus 40 outputs, to the display unit 92, each of the plurality of pieces of display image data received from the display image data generation unit 14.

Subsequently, in step S39, the display control apparatus 40 determines whether or not the series of processes is to be ended. When it is not determined that the series of processes is to be ended (step S39: No), the display control apparatus 40 returns the process to step S30. When it is determined that the series of processes is to be ended (step S39: Yes), the display control apparatus 40 ends the process.

As a result of the processes described above, the display control apparatus 40 sets the angles of view of the extracted images in accordance with the change in the traveling direction of the vehicle 90. The above description uses the example in which the predicted traveling direction is the first direction; however, needless to say, the processes described above are also applicable to processes performed when the predicted traveling direction is the second direction.

Next, an example in which the vehicle 90 keeps traveling straight in the advancing direction, i.e., the example in which no change in the traveling direction is detected, will be referred to as a third example. In the third example, the left camera 91A captures the same image as the image shown in FIG. 4. Because no change in the traveling direction is detected, the extracted image data generation unit 13 sets the angle of view to the angle of view A11 and extracts the region indicated by the border T11, so as to generate first extracted image data from the captured data shown in FIG. 4.

Further, similarly to the example with the left camera 91A, with respect to the right camera 91B also, the extracted image data generation unit 13 generates second extracted image data of an extracted image related to the angle of view B11, when no change in the traveling direction is detected.

After that, the size assignment unit 18 assigns an image size of the display image (explained later) with respect to each of the first and the second extracted image data. Further, the display image data generation unit 14 performs a conversion process on the extracted images so that the border is rectangular, while the images each have the assigned image size of the display image.

Figure 16:
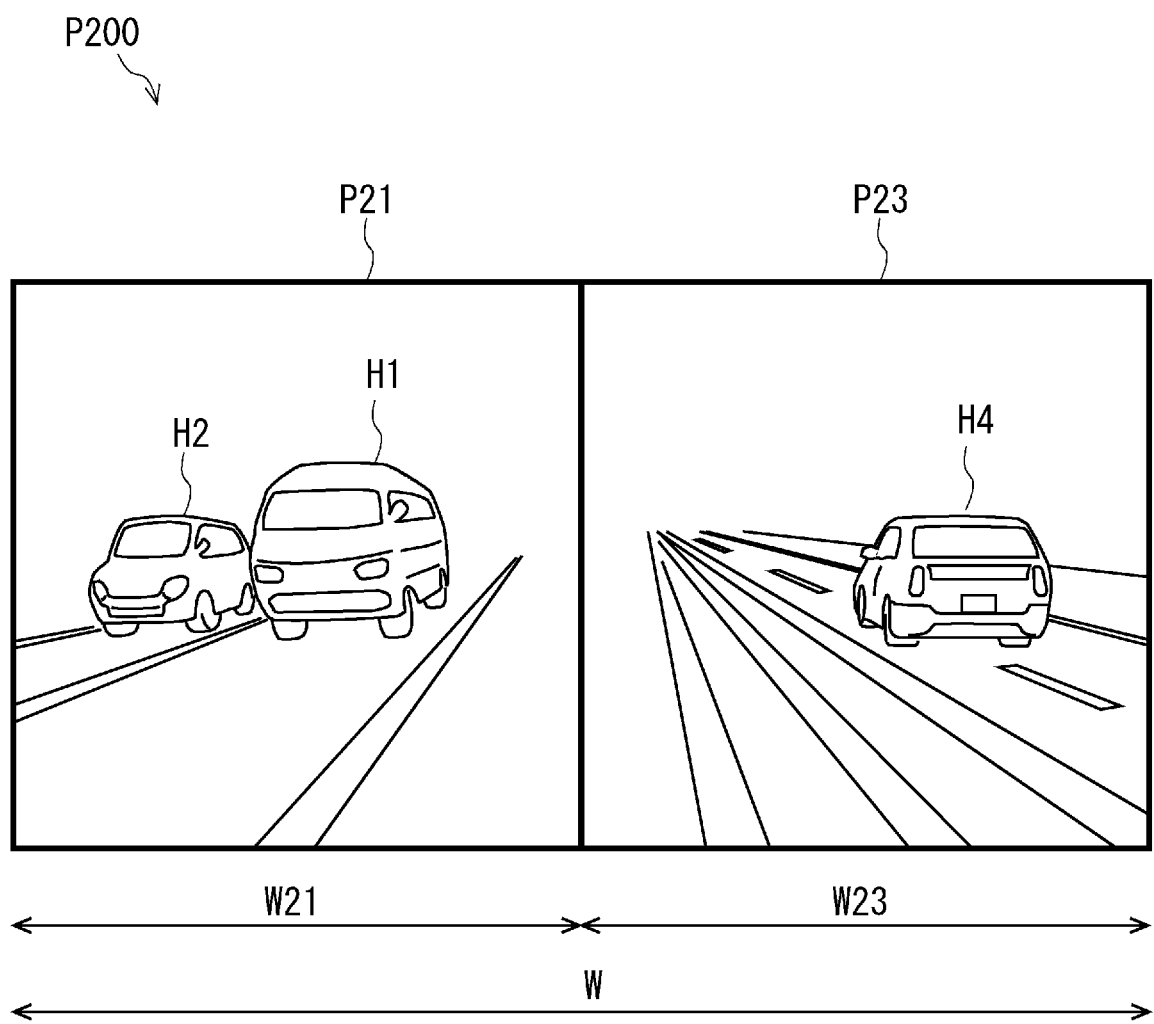
FIG. 16 is a drawing showing a third example of a display image displayed on a display unit according to the fourth embodiment.

Next, an example of a display image displayed on the display unit 92 will be explained, with reference to FIG. 16. FIG. 16 is a drawing showing the third example of the display image displayed on the display unit 92 according to the fourth embodiment. FIG. 16 shows a display image P200. The display image P200 includes a left display image (the first display image in the present example) P21 and a right display image (the second display image in the present example) P23.

The left display image P21 is the same image as the left display image P11 in FIG. 5. The right display image P23 is the same image as the right display image P13 in FIG. 5.

In this situation, the display image P200 has a width W. Further, within the display image P200, the left display image P21 is displayed in a region having a width W21. Further, within the display image P200, the right display image P23 is displayed in a region having a width W23. As shown in the present drawing, the sum of the dimensions of the width W21 and the width W23 is equal to the dimension of the width W. The width W21 and the width W23 may have equal dimension.

As shown in the present drawing, the dimensions of the width W21 and the width W23 may be determined in advance so that the left display image P21 and the right display image P23 are generated as images having substantially no distortion, from the first and the second extracted image data of the extracted images having the lens distortion, respectively.

In the first example, the size assignment unit 18 assigns a first image size corresponding to the dimension of the width W21 to the first extracted image data and a second image size corresponding to the dimension of the width W23 to the second extracted image data. After that, the display image data generation unit 14 has generated the left display image P21 and the right display image P23 having substantially no distortion, based on the image sizes.

Next, an example in which a change in the traveling direction is detected, and the predicted traveling direction is the left direction (i.e., the first direction) will be referred to as a fourth example. In the fourth example, the left camera 91A captures the same image as the image shown in FIG. 6.

To generate first extracted image data from the captured data shown in FIG. 6, the extracted image data generation unit 13 sets the angle of view to the angle of view A12 because the predicted traveling direction is the left direction and further extracts the region indicated by the border T12.

In contrast, similarly to the third example, with respect to the right camera 91B, the extracted image data generation unit 13 generates second extracted image data of an extracted image related to the angle of view B11.

After that, the size assignment unit 18 assigns an image size of the display image (explained later) with respect to each of the first and the second extracted image data. Further, the display image data generation unit 14 performs a conversion process on the extracted images so that the border is rectangular, while the images each have the assigned image size of the display image.

Figure 17:
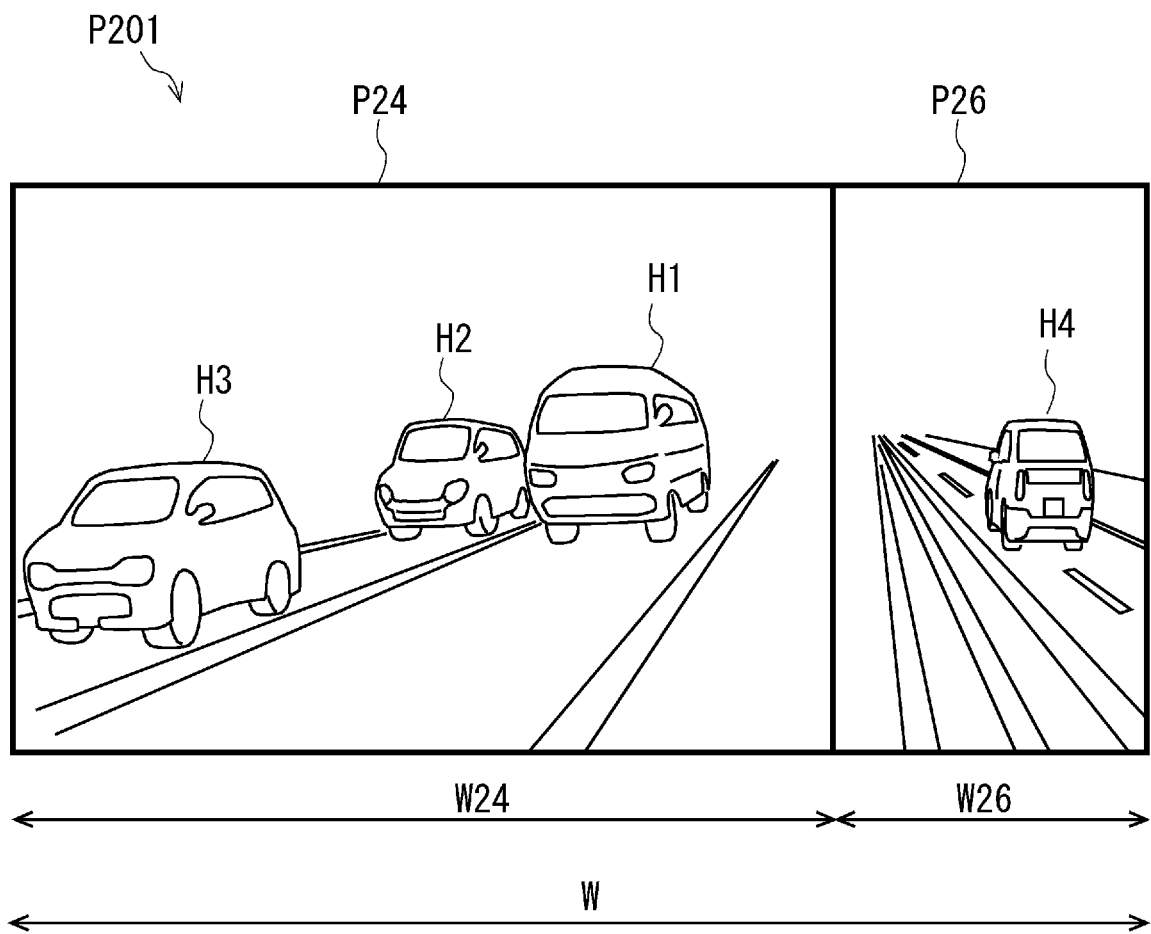
FIG. 17 is a drawing showing a fourth example of the display image displayed on the display unit according to the fourth embodiment.

Next, an example of a display image displayed on the display unit 92 will be explained, with reference to FIG. 17. FIG. 17 is a drawing showing the fourth example of the display image displayed on the display unit 92 according to the fourth embodiment. FIG. 17 shows a display image P201. The display image P201 is different from the image P200 shown in FIG. 16 for including a left display image P24 and a right display image P26, in place of the left display image P21 and the right display image P23. In the following sections, differences from the image P200 will primarily be explained.

The left display image P24 shown in FIG. 17 was generated from the first extracted image data extracted by the border T12 shown in FIG. 6. Accordingly, the left display image P24 contains the other vehicle H3 in addition to the other vehicles H1 and H2.

In this situation, the width W24 of the region displaying the left display image P24 is larger than the width W21 of the left display image P21 shown in FIG. 16. In other words, in relation to the predicted traveling direction, with respect to the left display image P24 from the first extracted image data of the extracted image related to a wider angle of view than that in the third example, the size assignment unit 18 determines the dimension of the width W24 so that the left display image P24 becomes an image having substantially no distortion.

In contrast, the right display image P26 is generated from an extracted image extracted by the border related to the angle of view B11, which is the same as that in the third example. Similarly to the third example, the right display image P26 contains another vehicle H4.

In this situation, the width W26 of the region displaying the right display image P26 is smaller than the width W24 of the region displaying the left display image P24. In the present drawing, the sum of the dimensions of the width W24 and the width W26 is equal to the sum of the dimensions of the width W21 and the width W23 shown in FIG. 16, i.e., equal to the dimension of the width W. In other words, with respect to the right display image P26 from the second extracted image data relevant to the direction different from the predicted traveling direction, the size assignment unit 18 assigns the dimension obtained by subtracting the dimension of the width W24 corresponding to the left display image P24 from the dimension of the width W, as the dimension of the width W26.

In other words, the size assignment unit 18 determines the image size of the display image relevant to the predicted traveling direction and further assigns the image size of the display image relevant to the direction different from the predicted traveling direction based on the difference between the total image size and the determined image size.

In this situation, the width W26 of the region displaying the right display image P26 is smaller than the width W23 of the right display image P23 shown in FIG. 16. Accordingly, when the right display image P23 is compared with the right display image P26, the right display image P26 is relatively shrunk along the width direction.

As explained above, the display control apparatus 40 according to the fourth embodiment generates the plurality of pieces of extracted image data by using the angles of view set in accordance with the motion state. As a result, without the need to enlarge the area of the display part, it is possible to easily display the information of a wider range with regard to the location which the user wishes to check. Further, based on the motion state, the display control apparatus 40 assigns the image size to each of the plurality of pieces of extracted image data. Consequently, without the need to enlarge the area of the display part, the information about a more important location is displayed relatively large in accordance with the motion state. The user is thus able to more easily check the information about the location which he/she wishes to check. As described herein, the display control apparatus 40 according to the fourth embodiment is able to suitably assist driving of the user, by suitably displaying the images captured by the cameras.

First Modified Example of Fourth Embodiment

In the fourth embodiment, the display control apparatus 40 sets the angle of view of the extracted image relevant to the direction different from the predicted traveling direction to the first angle of view so as to cause the display unit 92 to display the display image of the extracted image related to the first angle of view. However, as an alternative, upon detection of a change in the traveling direction, the display control apparatus 40 may change the setting of the angle of view of the extracted image relevant to the direction different from the predicted traveling direction to the second angle of view, similarly to the angle of view of the extracted image relevant to the predicted traveling direction.

In other words, in step S32 shown in FIG. 15, the extracted image data generation unit 13 sets the angles of view of the extracted images to the second angle of view, regardless of the predicted traveling direction.

After that, in step S34 shown in FIG. 15, upon detection of a change in the traveling direction, the extracted image data generation unit 13 generates first extracted image data of an extracted image related to the angle of view A12. Further, in that situation, the extracted image data generation unit 13 generates second extracted image data of an extracted image related to the angle of view B12. On the contrary, when no change in the traveling direction is detected, the extracted image data generation unit 13 generates first extracted image data of an extracted image related to the angle of view A11. Further, in that situation, the extracted image data generation unit 13 generates second extracted image data of an extracted image related to the angle of view B11.

Figure 18:
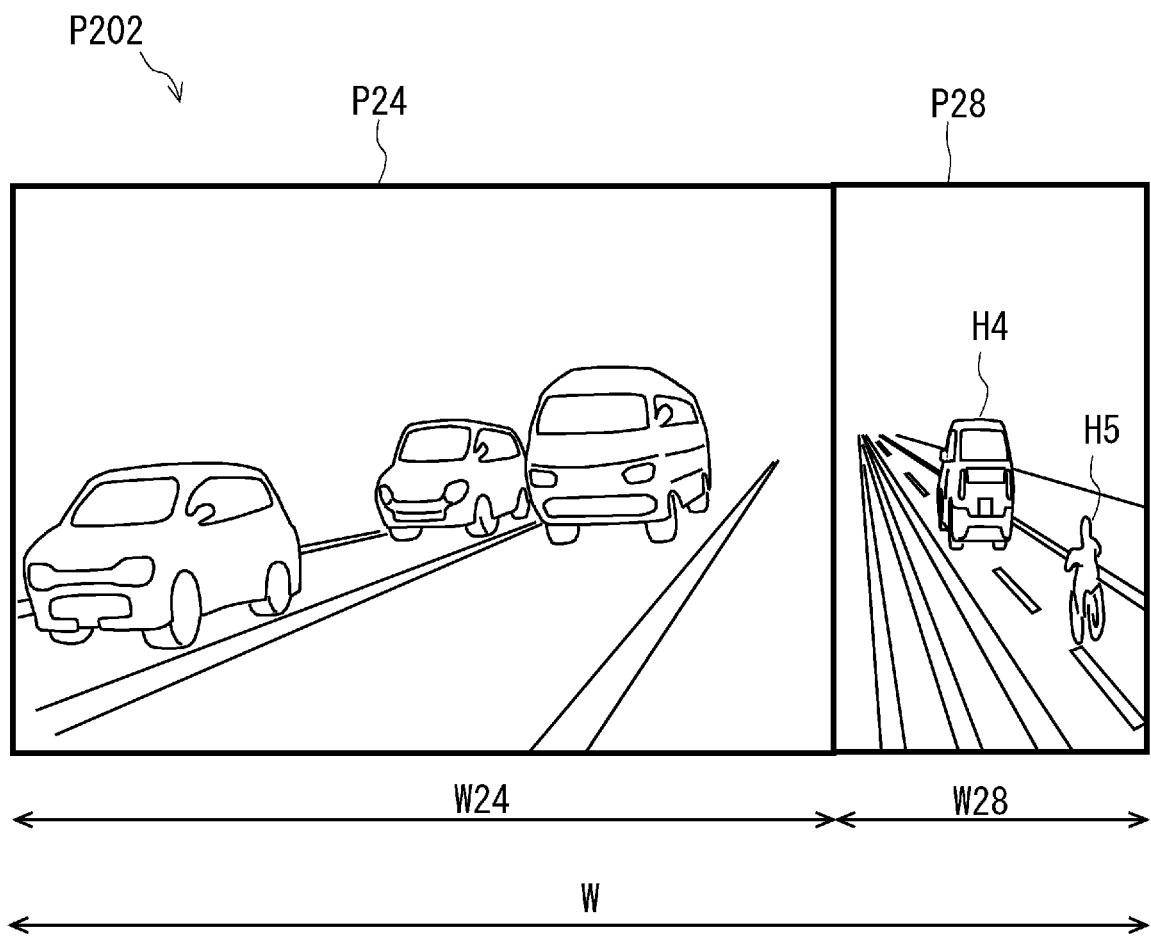
FIG. 18 is a drawing showing the fourth example of the display image displayed on a display unit according to a first modified example of the fourth embodiment.

A display image displayed on the display unit 92 according to the modified example described above will be explained with reference to FIG. 18. FIG. 18 is a drawing showing the fourth example of the display image displayed on the display unit 92 according to a first modified example of the fourth embodiment.

FIG. 18 shows a display image P202. The display image P202 is different from the image P201 shown in FIG. 17 for including a right display image P28 in place of the right display image P26. In the following sections, differences from the image P201 will primarily be explained.

The width W28 of the region displaying the right display image P28 is smaller than the width W24 of the region displaying the left display image P24. In the present drawing, the sum of the dimensions of the width W24 and the width W28 is equal to the sum of the dimensions of the width W24 and the width W26 shown in FIG. 17, i.e., equal to the dimension of the width W. In other words, similarly to the example with the right display image P26, with respect to the right display image P28 from the second extracted image data relevant to the direction different from the predicted traveling direction, the size assignment unit 18 assigns, as the dimension of the width W28, the dimension obtained by subtracting the dimension of the width W24 corresponding to the left display image P24 from the dimension of the width W.

The dimension of the width W28 of the region displaying the right display image P28 is equal to the dimension of the width W26 of the right display image P26 shown in FIG. 17. In this situation, the right display image P28 is generated from the extracted image extracted by the border related to the angle of view B12 that is wider than the angle of view B11. The right display image P28 contains another vehicle H5, in addition to the other vehicle H4 contained in the right display image P26. Accordingly, when the right display image P26 is compared with the right display image P28, the right display image P28 is relatively shrunk along the width direction.

Second Modified Example of Fourth Embodiment

In the fourth embodiment, the example of the two-screen display was explained. However, possible embodiments are not limited to this example. The display control apparatus 40 may display, in the display part of the display unit 92, a display image relevant to scenery on the rear side, in addition to the display images relevant to the scenery on the left side and on the right side of the vehicle 90 shown in FIG. 14. In other words, a second modified example is an example using a three-screen display.

In this situation, the extracted image data generated by the extracted image data generation unit 13 further includes third extracted image data relevant to the scenery on the side of a third direction (the rear in the present example) with respect to the vehicle, in addition to the first and the second extracted image data.

In the present example, the steps shown in FIG. 15 are modified as follows:

At first, in place of step S30, the captured data acquisition unit 11 of the display control apparatus 40 acquires the captured data from the left camera 91A, the right camera 91B, and the rear camera 91C.

In place of step S32 shown in FIG. 15, the extracted image data generation unit 13 changes the setting of the angle of view of the extracted image relevant to the scenery on the predicted traveling direction side, from the first angle of view to the second angle of view, based on the predicted traveling direction information. Further, with respect to the extracted image relevant to the opposite direction from the predicted traveling direction, the extracted image data generation unit 13 keeps the setting of the angle of view at the first angle of view. Also, the extracted image data generation unit 13 keeps the setting of the angle of view of the extracted image relevant to the rear side at C11. After that, the extracted image data generation unit 13 advances the process to step S34.

Further, in addition to step S34, the extracted image data generation unit 13 generates third extracted image data of the extracted image related to the angle of view C11 that has been set.

Further, in place of step S35, the extracted image data generation unit 13 determines whether or not three pieces of extracted image data have been generated. When it is determined that all the pieces of extracted image data have been generated, the extracted image data generation unit 13 advances the process to step S36. On the contrary, when the determination result is in the negative, the extracted image data generation unit 13 returns the process to step S34. After that, the extracted image data generation unit 13 supplies the three generated pieces of extracted image data to the display image data generation unit 14.

Further, in place of step S36, in response to the predicted traveling direction being the first direction, the size assignment unit 18 assigns image sizes so that the number of pixels included in the display image corresponding to the first extracted image data is larger than the number of pixels included in each of both of the display images corresponding to the second extracted image data and to the third extracted image data.

Figure 19A:
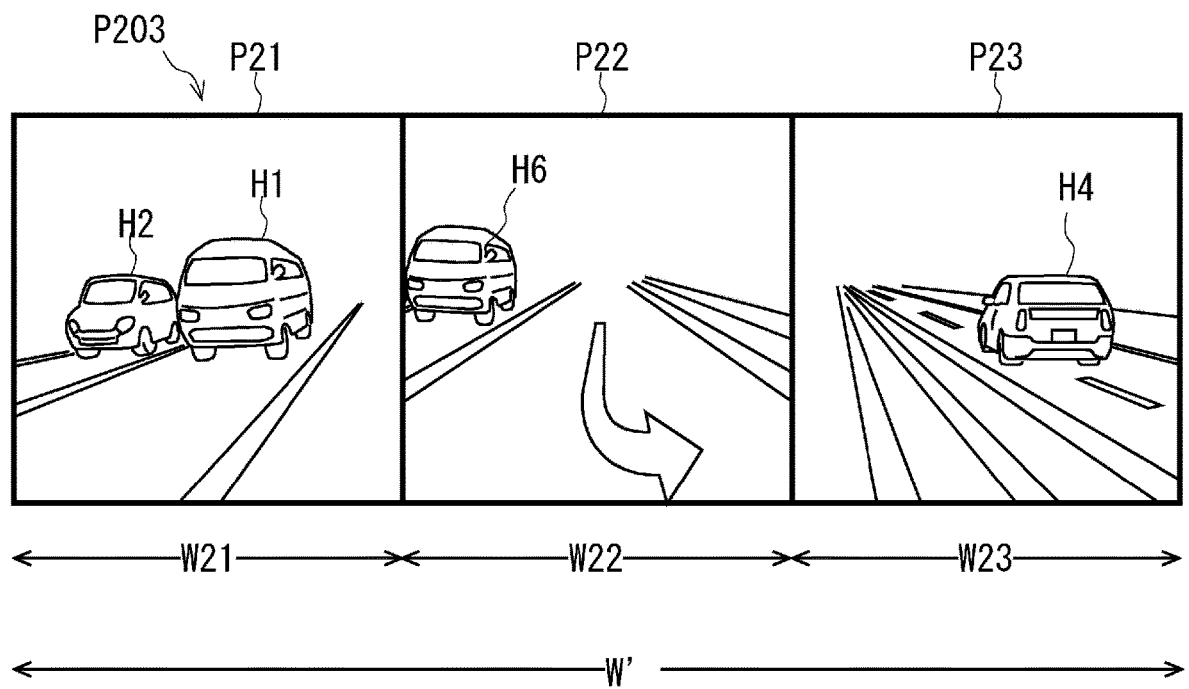
FIG. 19A is a drawing showing an example of a display image displayed on a display unit according to a second modified example of the fourth embodiment.
Figure 19B:
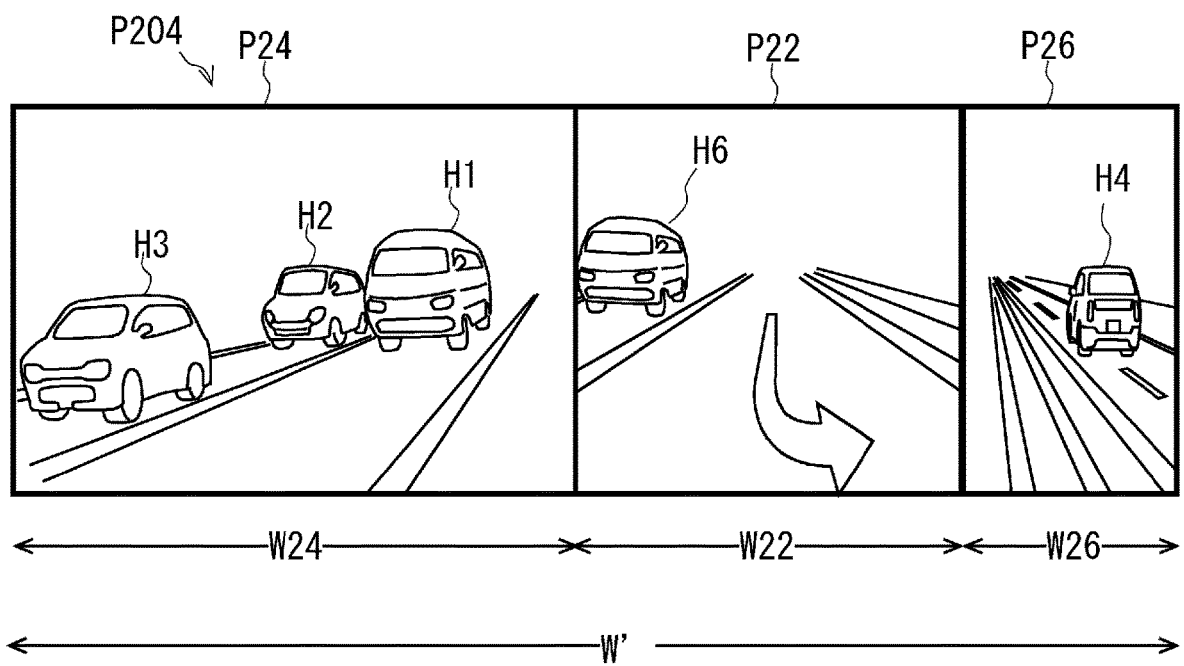
FIG. 19B is a drawing showing another example of the display image displayed on the display unit according to the second modified example of the fourth embodiment.
Figure 19C:
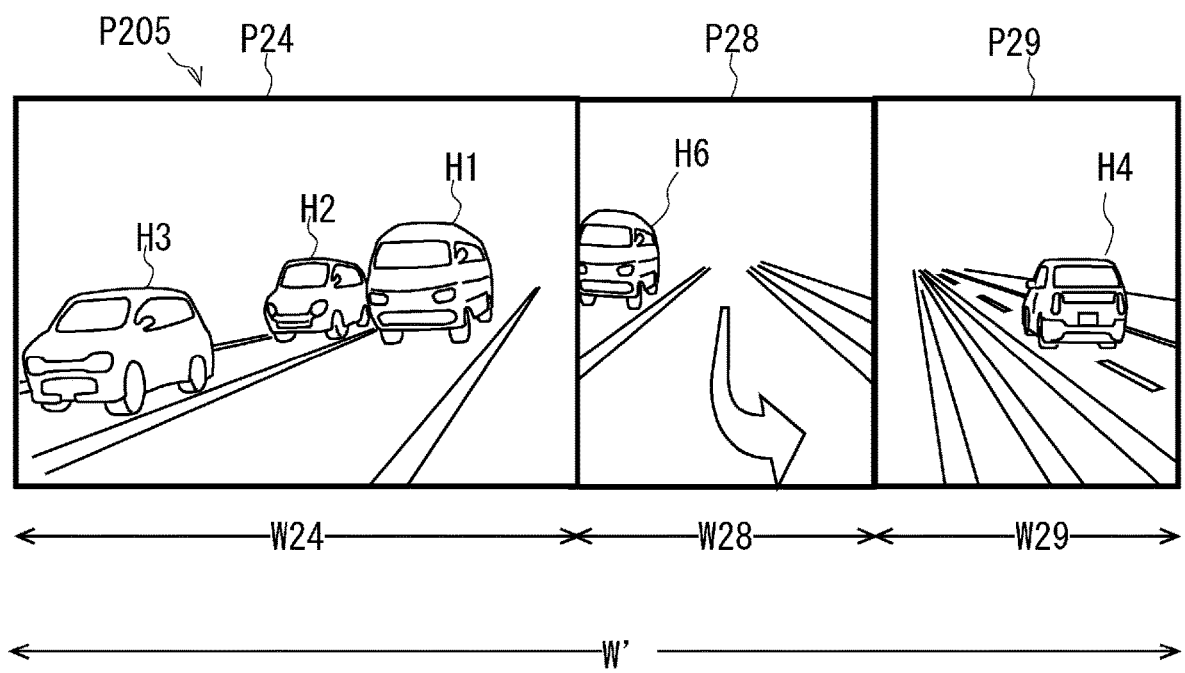
FIG. 19C is a drawing showing yet another example of the display image displayed on the display unit according to the second modified example of the fourth embodiment.

Next, a display image displayed on the display unit 92 in the example with the three-screen display will be explained with reference to FIG. 19. FIG. 19 presents drawings showing examples of the display image displayed on the display unit 92 according to the second modified example of the fourth embodiment. FIG. 19A corresponds to the third example in which no change in the traveling direction is detected. FIG. 19B and FIG. 19C each correspond to the fourth example in which a change in the traveling direction is detected. Certain elements corresponding to those in FIG. 16 and FIG. 17 will be referred to by using the same reference characters, and explanations thereof will be omitted.

FIGS. 19A to 19C show display images P203 to P205. The dimension of each of the display images P203 to P205 in the width direction is equally W'.

As shown in FIG. 19A, the display image P203 includes a rear display image (the third display image in the present example) P22, in addition to the left display image P21 and the right display image P23.

Within the display image P203, the rear display image P22 is displayed in a region of which the dimension in the width direction is W22. Further, as shown in the present drawing, the sum of the dimensions of W21, W22, and W23 is W'. The dimensions of W21, W22, and W23 may be equal to one another.

In the third example, the size assignment unit 18 assigns the dimension of the width W21 to the first extracted image data, the dimension of the width W23 to the second extracted image data, and the dimension of the width W22 to the third extracted image data. After that, the display image data generation unit 14 generates the left display image P21, the right display image P23, and the rear display image P22 having substantially no distortion, based on the image sizes corresponding to the dimensions.

As shown in FIG. 19B, the display image P204 includes the rear display image P22 having the width W22 equal to the dimension shown in FIG. 19A, in addition to the left display image P24 and the right display image P26.

With respect to the right display image P26 relevant to the opposite direction from the predicted traveling direction, the size assignment unit 18 assigns the dimension of the width W26 so that the right display image is relatively shrunk along the width direction as compared with the third example (the dimension of the width W26<the dimension of the width W23). In contrast, other than those, with respect to the rear display image P22 relevant to the rear side, the size assignment unit 18 assigns the dimension of the width W22 similarly to the third example. As described herein, the size assignment unit 18 may assign the corresponding dimensions in width direction, in accordance with the types of the extracted image data.

With these arrangements, the user of the vehicle 90 is also able to check the situation on the rear side of the vehicle 90, while the same advantageous effects as those in the fourth embodiment are achieved.

Further, in the fourth example, the size assignment unit 18 may assign, to the rear display image, a dimension in the width direction different from the dimension in the width direction in the third example, in accordance with the traveling speed of another vehicle H6 behind the vehicle 90. For example, in the fourth example, the size assignment unit 18 may assign a dimension in the width direction so that, when the traveling speed of the other vehicle H6 behind the vehicle 90 is lower than a prescribed threshold value, the dimension of the rear display image in the width direction is smaller than that in the third example.

As shown in FIG. 19C, the display image P205 includes, in place of the right display image P23 and the rear display image P22 in FIG. 19A, a right display image P29 having the width W29 and a rear display image P28 having the width W28. The width W28 of the rear display image P28 is smaller than the width W22 of the rear display image P22. As a result, the width W29 of the right display image P29 is larger than the width W26 of the right display image P26 shown in FIG. 19B.

Consequently, the shrinkage rate along the width direction of the right display image P29 with respect to the right display image P23 is smaller than that of the right display image P26. In other words, the right display image P29 has less image distortion compared to that of the right display image P26. Consequently, the user of the vehicle is able to easily check the situation on the opposite side from the predicted traveling direction of the vehicle, while the same advantageous effects as those of the fourth embodiment are achieved.

Fifth Embodiment

Next, a fifth embodiment of the present invention will be explained, with reference to FIGS. 20 and 21. The fifth embodiment is characterized in that the magnitude of the angles of view of the extracted images are set based on the traveling speed of the vehicle 90 in addition to the predicted traveling direction so that the image sizes of the display images are assigned based on the magnitude of the angles of view. A display control apparatus 50 according to the fifth embodiment basically has the same configuration and functions as those of the display control apparatus 40 according to the fourth embodiment. In the following sections, differences from the fourth embodiment will primarily be explained.

A motion state of the vehicle in the fifth embodiment includes a traveling speed of the vehicle in addition to changes in the traveling direction of the vehicle. Further, the extracted image data generation unit 13 according to the fifth embodiment sets the angles of view in accordance with the traveling speed of the vehicle, in addition to changes in the traveling direction of the vehicle. Further, the extracted image data generation unit 13 generates extracted image data of extracted images related to the angles of view that are set based on the predicted traveling direction and the traveling speed.

Further, the size assignment unit 18 according to the fifth embodiment assigns the image size of the display image corresponding to each of the plurality of pieces of extracted image data generated as described above.

Next, the angles of view in the fifth embodiment will be explained, with reference to FIG. 20. FIG. 20 is a top view showing captured ranges of the camera 91 on the vehicle 90 having the display control apparatus 50 according to the fifth embodiment installed therein. The top view of the vehicle 90 shown in FIG. 20 is different from that in FIG. 14 for further having the angle of view A13 of the left camera 91A and an angle of view B13 of the right camera 91B.

Figure 20:
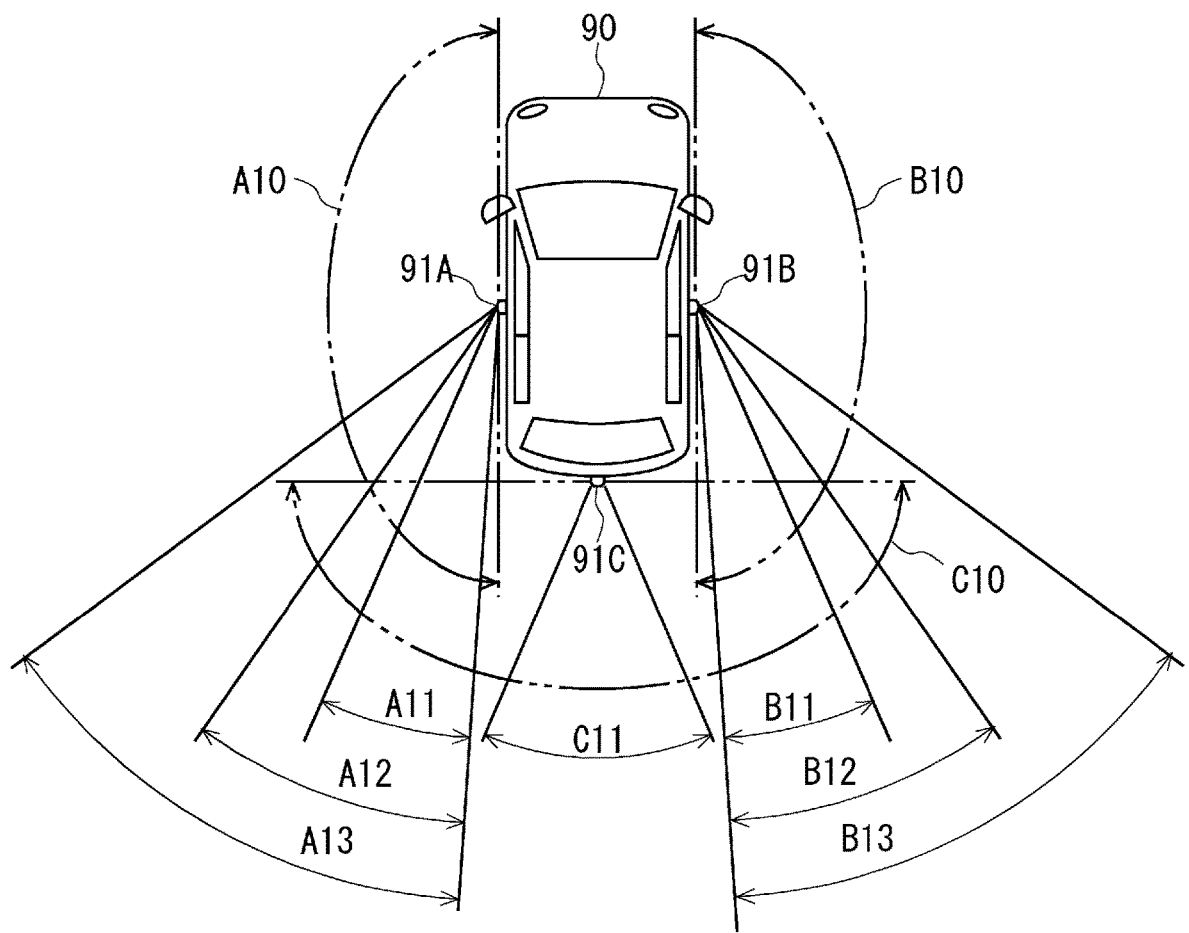
FIG. 20 is a top view showing captured ranges of cameras on a vehicle having a display control apparatus according to a fifth embodiment installed therein.
Figure 21:
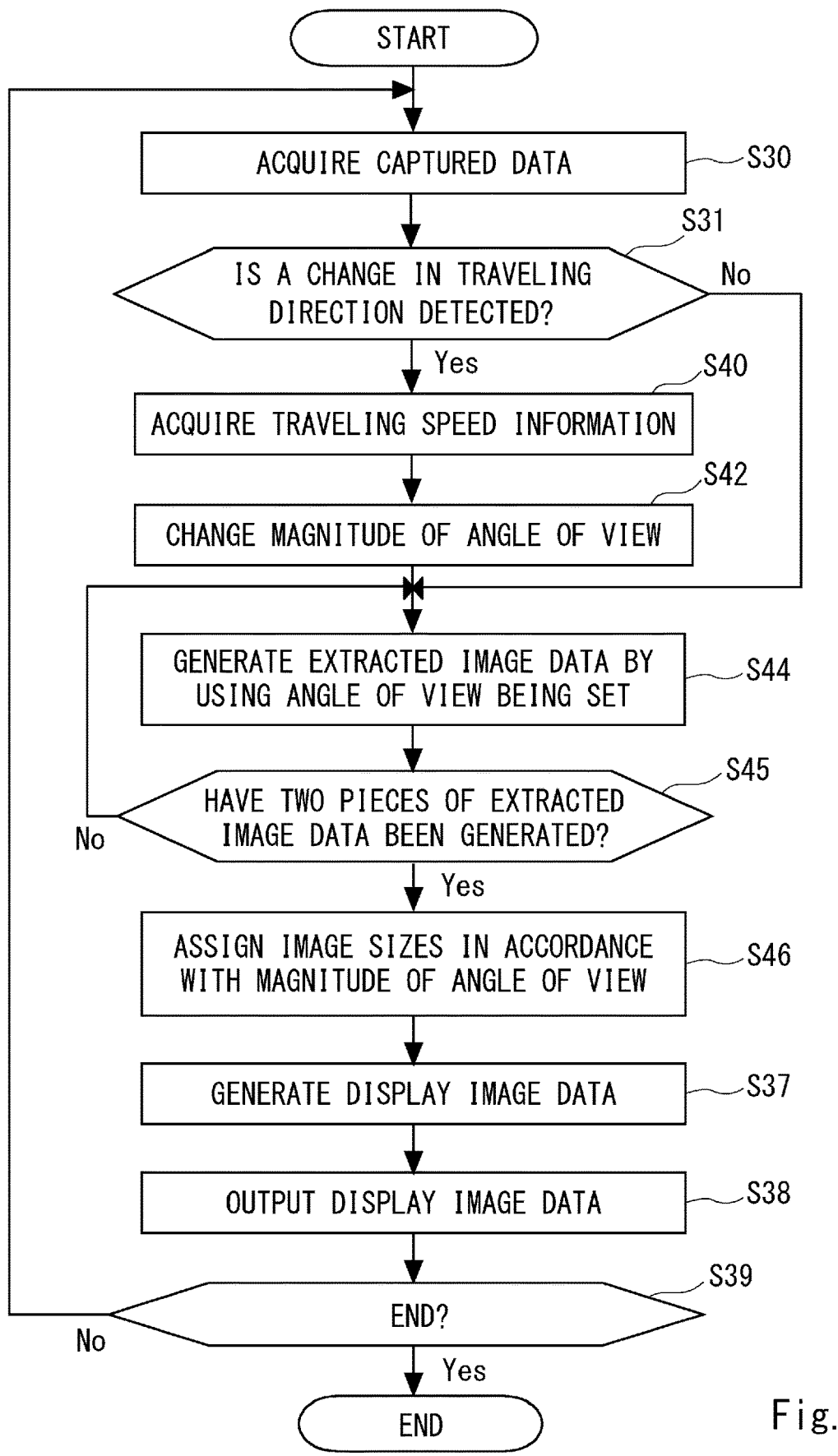
FIG. 21 is a flowchart of the display control apparatus according to the fifth embodiment.

In FIG. 20, the solid lines extending radially from the left camera 91A toward the left rear of the vehicle 90 indicate the angle of view A11, the angle of view A12 wider than the angle of view A11, and the angle of view A13 wider than the angle of view A12 of an extracted image extracted from the captured images of the left camera 91A.

In FIG. 20, the solid lines extending radially from the right camera 91B toward the right rear of the vehicle 90 indicate the angle of view B11, the angle of view B12 wider than the angle of view B11, and the angle of view B13 wider than the angle of view B12 of an extracted image extracted from the captured images of the right camera 91B.

For example, when the vehicle 90 keeps traveling straight in the advancing direction, the extracted image data generation unit 13 sets the angle of view related to the extracted image to the angle of view A11. In another example, when a change in the traveling direction of the vehicle 90 is detected, while the predicted traveling direction is the first direction, and the traveling speed is the first speed, the extracted image data generation unit 13 sets the angle of view related to the extracted image to the angle of view A12. When a change in the traveling direction of the vehicle 90 is detected, while the predicted traveling direction is the first direction, and the traveling speed is the second speed lower than the first speed, the extracted image data generation unit 13 sets the angle of view related to the extracted image to the angle of view A13.

When the predicted traveling direction is the second direction, the angle of view A11 is substituted with the angle of view B11; the angle of view A12 is substituted with the angle of view B12; and the angle of view A13 is substituted with the angle of view B13.

Next, processes performed by the display control apparatus 50 according to the fifth embodiment will be explained, with reference to FIG. 21. FIG. 21 is a flowchart of the display control apparatus 50 according to the fifth embodiment. The steps shown in FIG. 21 include steps S40 to S46, in place of steps S32 to S36 shown in FIG. 15. Some of the steps that are the same as those in FIG. 15 will be referred to by using the same reference characters, and explanations thereof will be omitted as appropriate.

In step S40, the motion state detection unit 12 detects a change in the traveling direction of the vehicle 90 and, in response to acquisition of the predicted traveling direction information (step S31: Yes), acquires traveling speed information related to the traveling speed of the vehicle. The motion state detection unit 12 supplies the predicted traveling direction information and the traveling speed information to the extracted image data generation unit 13.

After that, in step S42, the extracted image data generation unit 13 sets the magnitude of the angle of view of each of the plurality of extracted images of the mutually-different types, based on the predicted traveling direction information and the traveling speed information.

Subsequently, in step S44, the extracted image data generation unit 13 generates extracted image data corresponding to each of the plurality of extracted images, by using the angle of view set with respect to each of the plurality of extracted images. In this situation, when the predicted traveling direction is the first direction while the traveling speed is equal to or higher than a prescribed threshold value, the extracted image data generation unit 13 generates first extracted image data of an extracted image related to the angle of view A12 and second extracted image data of an extracted image related to the angle of view B11. In another example, when the predicted traveling direction is the first direction while the traveling speed is lower than the prescribed threshold value, the extracted image data generation unit 13 generates first extracted image data of an extracted image related to the angle of view A13 and second extracted image data of an extracted image related to the angle of view B11. In yet another example, when no change in the traveling direction is detected and no predicted traveling direction is acquired, the extracted image data generation unit 13 generates first extracted image data of an extracted image related to the angle of view A11 and second extracted image data of an extracted image related to the angle of view B11. After that, the extracted image data generation unit 13 supplies the generated plurality of pieces of extracted image data to the display image data generation unit 14.

Step S45 is the same as step S35.

Subsequently, in step S46, the size assignment unit 18 assigns an image size of the display image to each of the plurality of pieces of extracted image data in accordance with the magnitude of the angle of view being set. In this situation, the size assignment unit 18 may assign a first image size of the first display image based on the magnitude of the angle of view corresponding to the first extracted image data relevant to the predicted traveling direction and assign a second image size of the second display image based on the difference between a total image size and the first image size. In other words, based on the magnitude of the angle of view corresponding to the first extracted image data, the size assignment unit 18 may determine the image size of the display image corresponding to the second extracted image data. The size assignment unit 18 supplies information about the image size of the display image corresponding to each of the plurality of pieces of extracted image data to the display image data generation unit 14 and further advances the process to step S37.

As explained above, the display control apparatus 50 according to the fifth embodiment assigns the image size to each of the plurality of pieces of extracted image data, based on the magnitude of the angles of view that are set based on the predicted traveling direction and the traveling speed, so that the display images having the image sizes are displayed. Consequently, when the vehicle 90 lowers the traveling speed while approaching a traveling direction change point, the user of the vehicle 90 is able to more easily check the information of a wider range with regard to the location which he/she wishes to check, without the need to enlarge the area of the display part. Consequently, the display control apparatus 50 according to the fifth embodiment is capable of assisting driving of the user more suitably, by suitably displaying the images captured by the cameras.

Sixth Embodiment

Figure 22:
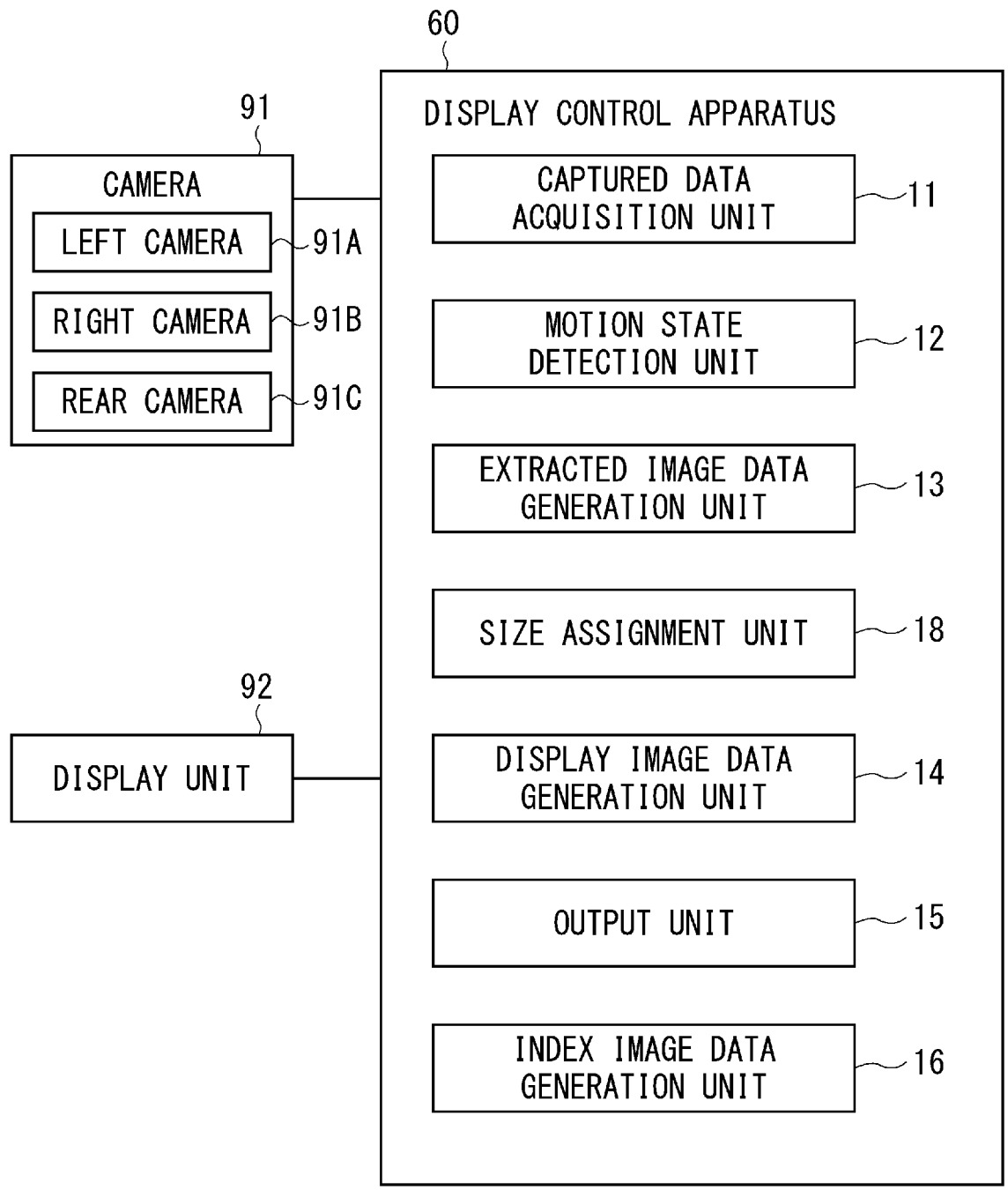
FIG. 22 is a block diagram of a display control apparatus according to a sixth embodiment.

Next, a sixth embodiment will be explained. The sixth embodiment is characterized in that a display control apparatus causes the display unit 92 to display index image data. FIG. 22 is a block diagram of a display control apparatus according to the sixth embodiment. A display control apparatus 60 according to the sixth embodiment includes an index image data generation unit 16, in addition to the configuration of the display control apparatus 50.

Figure 23:
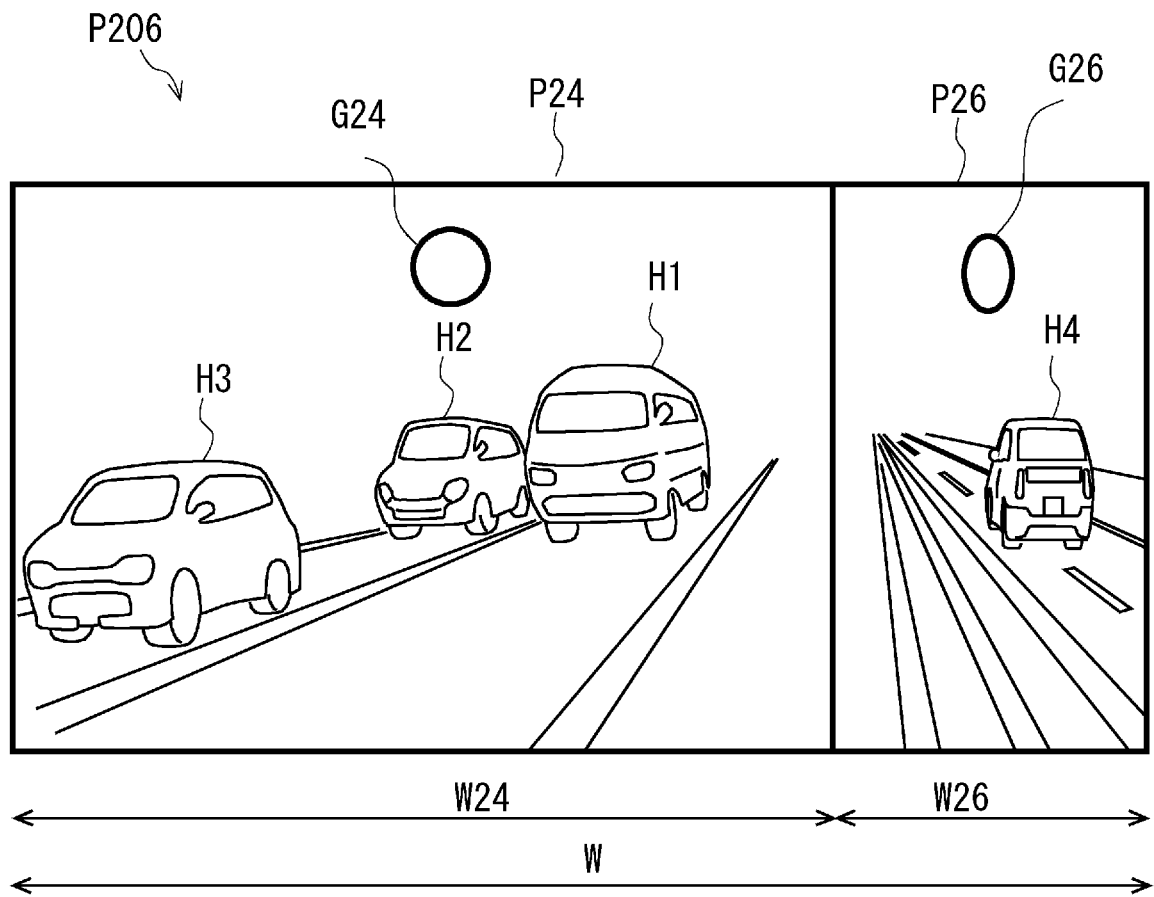
FIG. 23 is a drawing showing an example of a display image displayed on a display unit according to the sixth embodiment.

FIG. 23 is a drawing showing an example of a display image displayed on the display unit 92 according to the sixth embodiment. In an image P206 shown in FIG. 23, an index image is superimposed on the image P201 shown in FIG. 17. In an upper part of the left display image P24, an index image G24 is superimposed. In an upper part of the right display image P26, an index image G26 is superimposed.

The index image G26 has a shape relatively shrunk along the width direction, as compared to the index image G24. It is thus indicated that the right display image P26 related to the index image G26 is relatively shrunk along the width direction. From this display, the user is able to intuitively understand, by viewing the index image, how the display image related to the index image is distorted.

The sixth embodiment has thus been explained. The display control apparatus 60 according to the sixth embodiment displays the image shrunk along the width direction and also displays the index image indicating that the display image is shrunk and is in the distorted state. Consequently, according to the sixth embodiment, it is possible to provide a display control apparatus and the like capable of suitably displaying the images captured by the cameras.

Seventh Embodiment

Figure 24:
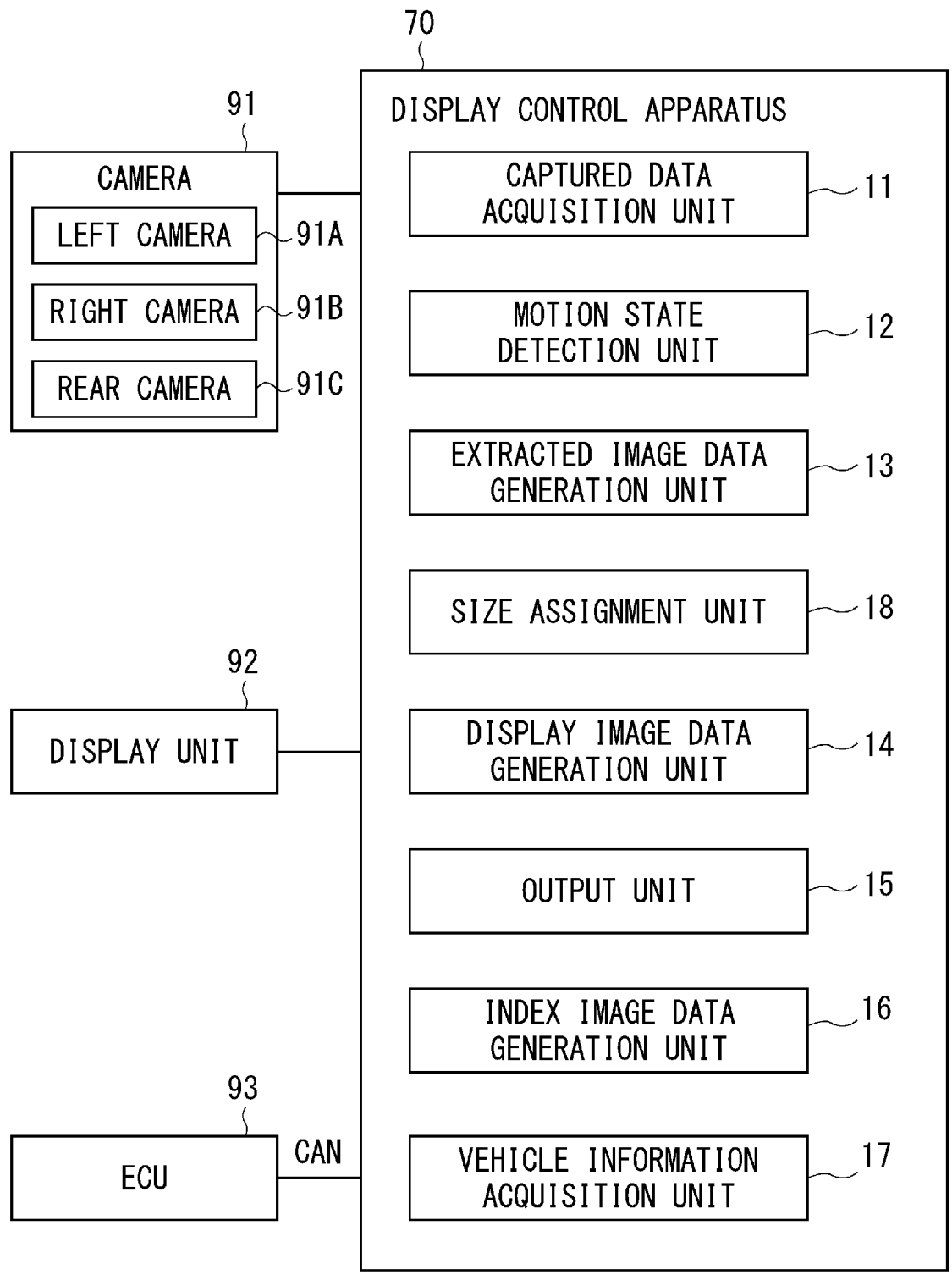
FIG. 24 is a block diagram of a display control apparatus according to a seventh embodiment.

Next, a seventh embodiment will be explained. The seventh embodiment is characterized in that a display control apparatus detects a motion state of the vehicle based on vehicle information. FIG. 24 is a block diagram of a display control apparatus according to the seventh embodiment. A display control apparatus 70 according to the seventh embodiment includes a vehicle information acquisition unit 17 in addition to the configuration of the display control apparatus 60.

Figure 25:
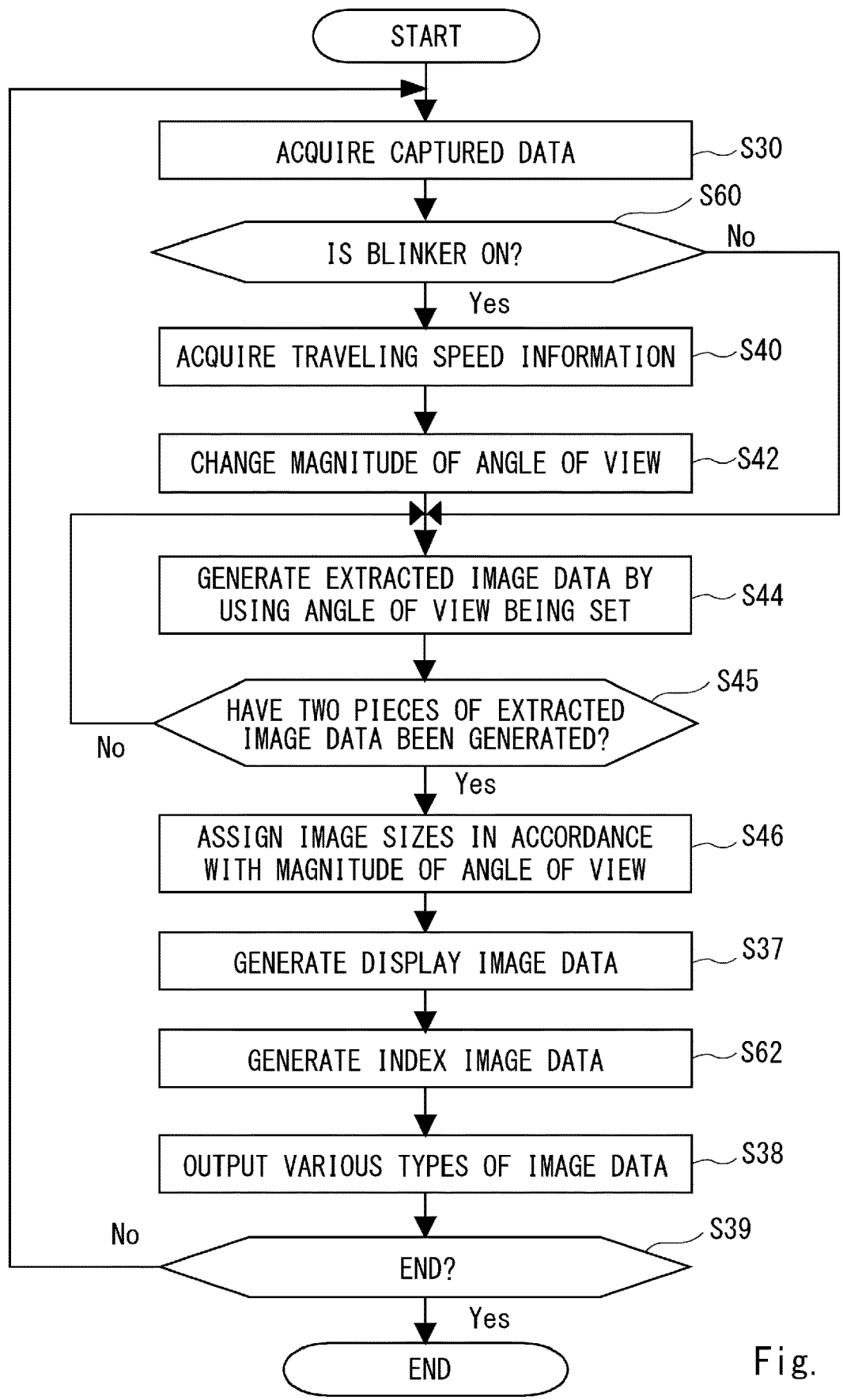
FIG. 25 is a flowchart of the display control apparatus according to the seventh embodiment.

Next, processes performed by the display control apparatus 70 according to the seventh embodiment will be explained, with reference to FIG. 25. FIG. 25 is a flowchart of the display control apparatus 70 according to the seventh embodiment. The steps shown in FIG. 25 include step S60 and step S62 in place of step S31 shown in FIG. 21. Some of the steps that are the same as those in FIG. 21 will be referred to by using the same reference characters, and explanations thereof will be omitted as appropriate.

In step S60, the motion state detection unit 12 of the display control apparatus 40 determines whether or not the blinker of the vehicle 90 is on, as a motion state of the vehicle 90. When it is determined that the blinker of the vehicle 90 is on (step S60: Yes), the motion state detection unit 12 generates predicted traveling direction information. After that, the motion state detection unit 12 supplies the predicted traveling direction information to the extracted image data generation unit 13 and the size assignment unit 18 and further advances the process to step S40. On the contrary, when it is not determined that the blinker of the vehicle 90 is on (step S60: No), the motion state detection unit 12 advances the process to step S44.

In step S62, the index image data generation unit 16 generates index image data with respect to each of the plurality of display images. After that, the index image data generation unit 16 supplies the index image data to the output unit 15. Further, in step S38, the output unit 15 outputs each of the plurality of pieces of display image data and the index image data corresponding thereto, to the display unit 92.

The seventh embodiment has thus been explained. The display control apparatus 70 according to the seventh embodiment is capable of setting the angles of view of the extracted images, in accordance with the driven state of the vehicle 90. Further, the display control apparatus 70 according to the seventh embodiment displays the image shrunk along the width direction and also displays the index image indicating that the display image is shrunk and is in the distorted state. Consequently, according to the seventh embodiment, it is possible to provide a display control apparatus and the like capable of suitably displaying the images captured by the cameras.

Further, the abovementioned program may be supplied to a computer, as being stored by using any of various types of non-transitory computer-readable media. The non-transitory computer-readable media include various types of tangible storage media. Examples of the non-transitory computer-readable media include a magnetic recording medium (e.g., a flexible disk, a magnetic tape, or a hard disk drive), a magneto-optical recording medium (e.g., a magneto-optical disk), a CD Read Only Memory (ROM), a CD-R, a CD-R/W, a semiconductor memory (e.g., a mask ROM, a Programmable ROM [PROM]), an Erasable PROM (EPROM), a flash ROM, and a Random Access Memory (RAM). Further, the program may be supplied to the computer via any of various types of transitory computer-readable media. Examples of the transitory computer-readable media include an electrical signal, an optical signal, and an electromagnetic wave. The transitory computer-readable media are able to supply the program to the computer via a wired communication path such as an electrical wire or an optical fiber or via a wireless communication path.

The present invention is not limited to the embodiments described above and may be modified as appropriate within a scope not departing the gist thereof.

The display control apparatuses according to the present embodiments are useful for drivers of vehicles to recognize the surrounding environment at the time of driving, for example.

What is claimed is:

1. A display control apparatus comprising:
   a first camera configured to capture scenery outside a vehicle;
   a second camera configured to capture scenery outside the vehicle;
   a processor coupled to a memory storing instructions to permit the processor to function as:
   a captured data acquisition unit configured to acquire a first captured data obtained by the first camera capturing scenery outside the vehicle and the second captured data obtained by the second camera capturing scenery outside the vehicle;
   a motion state detection unit configured to detect a motion state of the vehicle;
   an extracted image data generation unit configured to generate a first extracted image data relevant to the scenery on a side of a first direction with respect to the vehicle from an image related to the first captured data and a second extracted image data relevant to the scenery on a side of a second direction with respect to the vehicle from an image related to the second captured data by using an angle of view set in accordance with the motion state;
   a size assignment unit configured to, upon detection of the motion state, assign an image size of a display image corresponding to each of pieces of extracted image data, so as to be fitted to a total image size of a display unit, wherein the size assignment unit determines, for the first extracted image data extracted from the first capturing image data and the second extracted image data extracted from the second capturing image data, an image size of a display image corresponding to the second extracted image data, based on magnitude of an angle of view corresponding to the first extracted image data;
   a display image data generation unit configured to generate display image data related to a display image using information of the image size determined by the size assignment unit; and
   an output unit configured to output the display image data to the display unit having the image size.

2. The display control apparatus according to claim 1, wherein the processor is further configured to functions as a vehicle information acquisition unit configured to acquire vehicle information related to a driven state of the vehicle, wherein
   the motion state detection unit detects the motion state based on the vehicle information.

3. The display control apparatus according to claim 1, wherein
the motion state detection unit detects a traveling speed of the vehicle, and
the extracted image data generation unit generates the first and second extracted image data in which a first angle of view corresponding to the traveling speed at a first speed is set to be narrower than a second angle of view corresponding to a second speed lower than the first speed.

4. The display control apparatus according to claim 3, wherein, when the extracted image data generation unit has generated the first and second extracted image data set with the second angle of view, the display image data generation unit generates the display image data by shrinking an image related to the first and second extracted image data along a prescribed direction to convert the image size of the image to the image size that the display unit has.

5. The display control apparatus according to claim 1, wherein
with respect to each of the pieces of extracted image data, the display image data generation unit generates the display image data fitted to the assigned image size.

6. The display control apparatus according to claim 1, wherein
the motion state includes a change in a traveling direction of the vehicle, and
in response to the traveling direction being changed to the first direction, the size assignment unit assigns the image sizes so that a dimension in a primary direction of a display image corresponding to the first extracted image data is larger than a dimension in the primary direction of a display image corresponding to the second extracted image data.

7. The display control apparatus according to claim 1, wherein the processor is further configured to functions as an index image data generation unit configured to generate index image data for expressing distortion of the display image.

8. The display control apparatus according to claim 1, wherein a third camera is configured to capture scenery outside the vehicle,
wherein third captured data obtained by the third camera capturing scenery outside the vehicle;
wherein third extracted image data relevant to the scenery on a side of a third direction with respect to the vehicle is generated from an image related to the third captured data by using the angle of view set in accordance with the motion state,
wherein, upon detection of the motion state, the image size of the display image corresponding to the first extracted image data, the second extracted image data, and the third extracted image data is assigned so as to be fitted to the total image size of the display unit, and
wherein an image size of the display image corresponding to the third extracted image data is determined based on the magnitude of the angle of view corresponding to the first extracted image data and a magnitude of an angle of view corresponding to the second extracted image data.

9. A display control method comprising:
a captured data acquisition step of acquiring first captured data obtained by a first camera capturing scenery outside a vehicle and second captured data obtained by a second camera capturing scenery outside the vehicle;
a motion state detection step of detecting a motion state of the vehicle;
an extracted image data generation step of generating a first extracted image data relevant to the scenery on a side of a first direction with respect to the vehicle from an image related to the first captured data and a second extracted image data relevant to the scenery on a side of a second direction with respect to the vehicle from an image related to the second captured data by using an angle of view set in accordance with the motion state;
a size assignment step of assigning, upon detection of the motion state, an image size of a display image corresponding to each of pieces of extracted image data, so as to be fitted to a total image size of a display unit, the size assignment step comprising determining, for the first extracted image data extracted from the first captured data and the second extracted image data extracted from the second captured data, an image size of a display image corresponding to the second extracted image data, based on magnitude of an angle of view corresponding to the first extracted image data;
a display image data generation step of generating display image data related to a display image using information of the image size determined at the size assignment step; and
an output step of outputting the display image data to the display unit having the image size.

10. A non-transitory computer-readable medium that stores a program for causing a computer to implement a display control method comprising:
a captured data acquisition step of acquiring first captured data obtained by a first camera capturing scenery outside a vehicle and second captured data obtained by a second camera capturing scenery outside the vehicle;
a motion state detection step of detecting a motion state of the vehicle;
an extracted image data generation step of generating first extracted image data relevant to the scenery on a side of a first direction with respect to the vehicle from an image related to the first captured data and a second extracted image data relevant to the scenery on a side of a second direction with respect to the vehicle from an image related to the second captured data by using an angle of view set in accordance with the motion state;
a size assignment step of assigning, upon detection of the motion state, an image size of a display image corresponding to each of pieces of extracted image data, so as to be fitted to a total image size of a display unit, the size assignment step comprising determining, for the first extracted image data extracted from the first captured data and the second extracted image data extracted from the second captured data, an image size of a display image corresponding to the second extracted image data, based on magnitude of an angle of view corresponding to the first extracted image data;
a display image data generation step of generating display image data related to a display image using information of the image size determined at the size assignment step; and
an output step of outputting the display image data to the display unit having the image size.

* * * * *